(12) United States Patent
Breitweiser et al.

(10) Patent No.: US 12,524,967 B2
(45) Date of Patent: Jan. 13, 2026

(54) EXTENDED REALITY METHODS AND SYSTEMS FOR PROCESSING VEHICLE-RELATED INFORMATION

(71) Applicant: STATE FARM MUTUAL AUTOMOBILE INSURANCE COMPANY, Bloomington, IL (US)

(72) Inventors: Edward W. Breitweiser, Bloomington, IL (US); Ryan Gross, Normal, IL (US); Jeffrey W Stoiber, Atlanta, GA (US); Craig Cope, Bloomington, IL (US); Christopher N. Kawakita, Normal, IL (US); Matthew L. Floyd, Alpharetta, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 26 days.

(21) Appl. No.: 18/111,206

(22) Filed: Feb. 17, 2023

(65) Prior Publication Data
US 2023/0267551 A1 Aug. 24, 2023

Related U.S. Application Data

(60) Provisional application No. 63/320,270, filed on Mar. 16, 2022, provisional application No. 63/320,297, (Continued)

(51) Int. Cl.
*G06T 19/00* (2011.01)
*G06F 3/01* (2006.01)
(Continued)

(52) U.S. Cl.
CPC ............ *G06T 19/003* (2013.01); *G06F 3/011* (2013.01); *G06Q 40/08* (2013.01); *G06T 17/00* (2013.01); *G06V 20/20* (2022.01)

(58) Field of Classification Search
CPC ....... G06Q 40/08; G06T 19/003; G06T 17/00; G06V 20/20; G06F 3/011
(Continued)

(56) References Cited

U.S. PATENT DOCUMENTS

| 5,628,033 A | * | 5/1997 | Dilich | ................. | G03B 15/006 |
| | | | | | 348/136 |
| 8,954,226 B1 | * | 2/2015 | Binion | ................... | G07C 5/008 |
| | | | | | 701/33.4 |

(Continued)

FOREIGN PATENT DOCUMENTS

| CN | 113705351 B | * | 5/2024 | ........... G06F 18/214 |
| EP | 3239686 A1 | | 11/2017 | |

(Continued)

OTHER PUBLICATIONS

Wang, Shaohan, Sakib Ashraf Zargar, and Fuh-Gwo Yuan. "Augmented reality for enhanced visual inspection through knowledge-based deep learning." Structural Health Monitoring 20.1 (2021): 426-442. (Year: 2021).*

*Primary Examiner* — Sara C Hamilton
(74) *Attorney, Agent, or Firm* — MARSHALL, GERSTEIN & BORUN LLP

(57) ABSTRACT

Embodiments of extended reality (XR) methods and systems for processing vehicle-related insurance claims are disclosed. In one embodiment, a computer-implemented method may include: (i) obtaining, using one or more XR devices, first data representing insured party XR preferences, and second data related to a damage-causing event for a vehicle; (ii) creating, using one or more processors and based upon the second data, a virtual reconstruction of the damage-causing event; and/or (iii) presenting, in a virtualized environment in accordance with the XR preferences via an XR device, the virtual reconstruction such that the (Continued)

insured party or an insurance representative may view, alter, and/or approve the virtual reconstruction.

20 Claims, 17 Drawing Sheets

Related U.S. Application Data filed on Mar. 16, 2022, provisional application No. 63/318,325, filed on Mar. 9, 2022, provisional application No. 63/311,591, filed on Feb. 18, 2022.

(51) Int. Cl.
*G06Q 40/08* (2012.01)
*G06T 17/00* (2006.01)
*G06V 20/20* (2022.01)

(58) Field of Classification Search
USPC .......................................................... 705/4
See application file for complete search history.

(56) References Cited

U.S. PATENT DOCUMENTS

| | | | | |
|---|---|---|---|---|
| 9,691,189 B1* | 6/2017 | Creath | .................. | G06Q 10/06 |
| 9,830,748 B2 | 11/2017 | Rosenbaum | | |
| 9,886,841 B1* | 2/2018 | Nave | .................. | G06Q 40/08 |
| 9,990,782 B2 | 6/2018 | Rosenbaum | | |
| 10,269,190 B2 | 4/2019 | Rosenbaum | | |
| 10,373,387 B1 | 8/2019 | Fields et al. | | |
| 10,467,824 B2 | 11/2019 | Rosenbaum | | |
| 10,636,211 B1* | 4/2020 | Kuruvilla | ................ | G06T 19/20 |
| 10,685,400 B1* | 6/2020 | Brandmaier | .......... | G06Q 40/08 |
| 10,692,050 B2* | 6/2020 | Taliwal | .................. | G06V 10/82 |
| 10,719,966 B1* | 7/2020 | Davis | ..................... | H04N 23/80 |
| 10,824,867 B1 | 11/2020 | Assam | | |
| 10,956,981 B1* | 3/2021 | Fields | ..................... | G06Q 40/08 |
| 11,055,531 B1* | 7/2021 | Maestas | ................ | G06V 20/20 |
| 11,113,768 B1 | 9/2021 | Davis et al. | | |
| 11,132,481 B1 | 9/2021 | Davis et al. | | |
| 11,138,757 B2* | 10/2021 | Jovanovic | ............... | G06T 19/20 |
| 11,164,356 B1* | 11/2021 | Davis | ..................... | G06T 11/60 |
| 11,227,452 B2 | 1/2022 | Rosenbaum | | |
| 11,250,631 B1* | 2/2022 | Fields | ..................... | G06Q 40/08 |
| 11,379,886 B1* | 7/2022 | Fields | ..................... | G06Q 40/08 |
| 11,380,148 B2* | 7/2022 | Vijayan | ................... | G06T 19/00 |
| 11,407,410 B2 | 8/2022 | Rosenbaum | | |
| 11,524,707 B2 | 12/2022 | Rosenbaum | | |
| 11,594,083 B1 | 2/2023 | Rosenbaum | | |
| 11,620,862 B1* | 4/2023 | Serrao | .................... | G06T 13/80 |
| | | | | 345/419 |
| 11,776,142 B2* | 10/2023 | Holzer | ................... | H04N 23/64 |
| | | | | 382/154 |
| 11,798,235 B1* | 10/2023 | Bhushan | ................ | G06T 17/20 |
| 11,810,202 B1* | 11/2023 | Little | ...................... | G06F 16/29 |
| 11,823,337 B2* | 11/2023 | Fields | .................... | G06F 40/169 |
| 11,846,514 B1* | 12/2023 | Kentley-Klay | ........ | H04W 4/025 |
| 11,893,840 B2* | 2/2024 | Cardona | ................ | G06Q 40/08 |
| 11,954,315 B1* | 4/2024 | Megyese | ................ | G06F 30/15 |
| 2003/0046003 A1* | 3/2003 | Smith | .................... | G01C 15/00 |
| | | | | 342/357.31 |
| 2012/0116819 A1* | 5/2012 | Hertenstein | ........... | G06Q 10/10 |
| | | | | 705/4 |
| 2015/0029308 A1* | 1/2015 | Han | ..................... | G08G 1/0112 |
| | | | | 348/43 |
| 2016/0189310 A1* | 6/2016 | O'Kane | .................. | G06Q 40/08 |
| | | | | 705/4 |
| 2017/0053461 A1* | 2/2017 | Pal | ......................... | G08G 1/012 |
| 2019/0051046 A1* | 2/2019 | Jin | ....................... | H04N 23/695 |
| 2019/0251750 A1* | 8/2019 | Brewer | ................. | G06F 3/0304 |
| 2019/0303463 A1* | 10/2019 | Catalano | ................. | G06F 16/22 |
| 2020/0058219 A1* | 2/2020 | Hassani | ................ | G06Q 40/08 |
| 2020/0111264 A1* | 4/2020 | Kuruvilla | ................ | G06T 19/20 |
| 2020/0327743 A1* | 10/2020 | Cannarsa | ............... | G06Q 40/08 |
| 2020/0357204 A1* | 11/2020 | Crequer | ............... | G07C 5/0841 |
| 2021/0042361 A1* | 2/2021 | Leise | ..................... | G06Q 10/20 |
| 2021/0166483 A1* | 6/2021 | Kozloski | ................ | G06T 19/20 |
| 2021/0225094 A1* | 7/2021 | Salodkar | ................ | G06N 20/00 |
| 2021/0312710 A1* | 10/2021 | Fathi | ..................... | G06F 30/10 |
| 2021/0383115 A1* | 12/2021 | Alon | ...................... | B25J 9/1602 |
| 2022/0058845 A1* | 2/2022 | Davis | .................... | H04N 23/80 |
| 2022/0075504 A1* | 3/2022 | Little | ................... | G06T 19/006 |
| 2022/0092893 A1 | 3/2022 | Rosenbaum | | |
| 2022/0156497 A1* | 5/2022 | Holzer | ................ | G06V 20/647 |
| 2022/0157031 A1* | 5/2022 | Fields | ................... | H04L 67/025 |
| 2022/0236787 A1* | 7/2022 | Kamhi | .................... | G06F 3/011 |
| 2022/0246036 A1* | 8/2022 | Petersen | ................ | G06Q 40/08 |
| 2022/0340148 A1 | 10/2022 | Rosenbaum | | |
| 2023/0060300 A1 | 3/2023 | Rosenbaum | | |
| 2023/0113765 A1* | 4/2023 | Patt | .................... | G06F 16/24553 |
| | | | | 705/4 |
| 2023/0114918 A1* | 4/2023 | Patt | ........................ | G07C 5/008 |
| | | | | 703/8 |
| 2023/0192087 A1* | 6/2023 | Ludwig | ................ | B62D 15/021 |
| | | | | 701/70 |

FOREIGN PATENT DOCUMENTS

| | | | | |
|---|---|---|---|---|
| EP | 3578433 B1 | 8/2020 | | |
| EP | 3730375 B1 | 10/2021 | | |
| EP | 3960576 A1 | 3/2022 | | |
| EP | 4190659 A1 | 6/2023 | | |
| EP | 4190660 A1 | 6/2023 | | |
| GB | 2596137 A * | 12/2021 | ......... | G06K 9/00791 |

* cited by examiner

LIFE INSURANCE APPLICATIONS (MODIFIED) 1500

DIGITALIZE LIFE INSURANCE POLICY 1502, such as use Virtual Headset (e.g., AR/VR/XR Headset or Smart Glasses, and/or Chat Bot) to Visually or Audibly capture/collect Life Insurance Policy terms and conditions, and extract Beneficiary information, name, etc.

RECEIVE OR CREATE DIGITALIZED DATA OF BENEFICIARY 1504, such as use Virtual Headset to Visually or Audibly capture/collect:
- Personal/social media data;
- Financial account data; and/or
- Metaverse location/avatar data

CREATE PERSONALIZED USER EXPERIENCE FOR BENEFICIARY 1506, such as use Virtual Headset to Visually or Audibly capture/collect Beneficiary's:
- Preferences on virtual or actual communications;
- Preferences on virtual or actual agent interactions,
- Preferences on metaverse location for interactions; and/or
- Preferences for monetary or personal articles disposition

NOTIFY BENEFICIARY OF INSURED'S DEATH 1508, via Virtual Headset or other communication

HANDLE LIFE INSURANCE DISPOSITION VIRTUALLY in AR/VR/XR World 1510, via Virtual Headset, such as allow Beneficiary to be led through the Life Insurance bequeaths in a metaverse room or location of their choosing (such as from Beneficiary user experience preferences determined previously), and interacting with either a virtual or actual agent, and allow Beneficiary to select payment options or accounts virtually, visually, or audibly

FIGURE 15

AUTO & HOMEOWNERS INSURANCE APPLICATIONS 1600

RECEIVE OR CREATE DIGITALIZED DATA OF INSURED 1602, such as use Virtual Headset (e.g., AR/VR/XR Headset or Smart Glasses, and/or Chat Bot) to Visually or Audibly capture/collect:
- Personal/social media data;
- Insured asset data (house, vehicles, personal belongings, etc.);
- Insurance Policy data and conditions; and/or
- Metaverse location/avatar data Insured Collects Data of Damaged Vehicle or Damaged Home via Virtual Headset 1604

Collect Vehicle Crash or Home Event Data via smart infrastructure, home and vehicle sensors, mobile device data, etc. 1606

Reconstruct Event using data collected 1608

Insured & Agent view/alter/adjust Virtual Reconstruction via Virtual Headset using visually icons/pointers, and chat bot 1610

Put "Verified" Virtual Reconstruction on Blockchain for others to view, and for claim handling and subrogation purposes/dispute resolution 1612

Analyze Damaged Vehicle or Damaged Home Data via Machine Learning algorithm/model 1614 to:
- Estimate Repair/Replacement Costs;
- Identify Repair/Replacement Materials;
- Schedule Repairs; and/or
- Prepare Insurance Claim for Insured's Review/Approval/Modification Create Virtual Reconstruction/Repairs for Insured to View/Approve/Alter via Virtual Headset (Insured may alter visually and/or audibly) 1616

FIGURE 16

HOMEOWNERS INSURANCE APPLICATIONS 1700

RECEIVE OR CREATE DIGITALIZED DATA OF INSURED 1702, such as use Virtual Headset (e.g., AR/VR/XR Headset or Smart Glasses, and/or Chat bot) to Visually or Audibly capture/collect:
- Personal/social media data;
- Insured asset data (house, vehicles, personal belongings);
- Insurance Policy data; and
- Metaverse location/avatar data Insured Walks Through Home with Virtual Headset to collect data of Home Features, Personal Articles, Vehicles, Boats, etc. 1704

Use Machine Learning to Create List of Personal Articles, House Features, & Vehicles 1710

Use Machine Learning to Identify Areas of Risk 1706

Generate Home, Vehicle, Personal Articles Ins. Quotes 1712

Identify Mitigating Actions and Offer Discounts 1708

Identify Items (Boats, Buildings, etc. on Property) currently under insured or uninsured, and generate quote or endorsement 1714

Parametric Insurance: For Personal Articles, detect home Trigger Event using sensor data, and generate insurance claim using cost of personal articles lost for insured's review/adjustment/approval 1716

House Remodeling: Create Options for Home Remodeling for Insured to View in Virtual Headset, such as display various options for bath or kitchen remodel, with different materials and different costs visually displayed or audibly presented, with insured able to alter or adjust remodeling plans via visually icons or audible interaction with Virtual Headset and/or Chat Bot 1718

Allow Insured to Schedule Remodeling and Review/Approve Financing Options via Virtual Headset and/or Chat Bot 1720

FIGURE 17

EXTENDED REALITY METHODS AND SYSTEMS FOR PROCESSING VEHICLE-RELATED INFORMATION

CROSS-REFERENCE TO RELATED APPLICATIONS

This application claims the benefit of: (1) U.S. Provisional Patent Application No. 63/311,591, entitled "Virtual Headset Applications & Personalized Virtual User Experiences" and filed on Feb. 18, 2022; (2) U.S. Provisional Patent Application No. 63/318,325, entitled "Extended Reality Methods and Systems for Processing Vehicle-Related Information" and filed on Mar. 9, 2022; (3) U.S. Provisional Patent Application No. 63/320,270, entitled "Extended Reality Methods and Systems for Obtaining and Handling Estate Data," and filed on Mar. 16, 2022; and (4) U.S. Provisional Patent Application No. 63/320,297, entitled "Extended Reality Methods and Systems for Collecting, Managing, and Using Home-Related Information," and filed on Mar. 16, 2022. The disclosure of each of the above-identified patent applications is hereby incorporated herein by reference in its entirety.

FIELD

The present disclosure generally relates to extended reality (XR), and, more particularly, to XR methods and systems for processing vehicle-related insurance claims.

BACKGROUND

In commercial settings, conventional approaches to customer interactions (e.g., for collecting customer information and/or providing information to customers) have various drawbacks, such as inefficient or ineffective relaying of information, as well as an inability to collect complete and/or accurate datasets. The present embodiments may overcome these and/or other deficiencies.

BRIEF SUMMARY

Present embodiments include XR systems, methods, environments, and experiences for processing vehicle-related insurance claims. In some embodiments, the XR systems may include XR systems, AR (Augmented Reality) systems, VR (Virtual Reality) systems, and/or smart glasses. The XR systems may be configured to generate or create personalized XR user experiences.

In one aspect, a computer-implemented method may include: (1) obtaining, using one or more extended reality (XR) devices, first data representing insured party XR preferences, and second data related to a damage-causing event involving a vehicle; (2) creating, using one or more processors and based upon the second data, a virtual reconstruction of the damage-causing event; and/or (3) presenting, in a virtualized environment in accordance with the insured party XR preferences via an XR device, the virtual reconstruction such that the insured party or an insurance representative can at least one of view, alter, or approve the virtual reconstruction.

In another aspect, a system may include: (1) a communication interface configured to receive, using one or more extended reality (XR) devices first data associated with insured party XR preferences, and second data related to a damage-causing event involving a vehicle; and (2) one or more processors configured to: (i) create, based upon the second data, a virtual reconstruction of the damage-causing event, and/or (ii) present, in a virtualized environment in accordance with the insured party XR preferences via an XR device, the virtual reconstruction such that the insured party or an insurance representative can at least one of view, alter, or approve the virtual reconstruction.

In another aspect, a non-transitory computer-readable storage medium stores instructions that, when executed by one or more processors, may cause a system to: (1) obtain, using one or more extended reality (XR) devices, first data representing insured party XR preferences, and second data related to a damage-causing event involving a vehicle; (2) create, using one or more processors and based upon the second data, a virtual reconstruction of the damage-causing event; and/or (3) present, in a virtualized environment in accordance with the insured party XR preferences via an XR device, the virtual reconstruction such that the insured party or an insurance representative can at least one of view, alter, or approve the virtual reconstruction.

Advantages will become more apparent to those skilled in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of example XR systems, XR devices, XR experiences, XR environments, and XR methods disclosed therein. It should be understood that each Figure depicts embodiments of particular aspects of the disclosed XR systems, devices, experiences, environments, and methods, and that each of the Figures is intended to accord with one or more possible embodiments thereof. Alternative embodiments of the XR systems, devices, experiences, environments, and methods illustrated herein may be employed without departing from the principles of the invention described herein.

There are shown in the drawings arrangements which are presently discussed, it being understood, however, that the present embodiments are not limited to the precise arrangements and instrumentalities shown, wherein:

FIG. 15 illustrates another computer-implemented method utilizing a personalized virtual user experience to dispose of assets identified in a life insurance policy, will, or trust;

FIG. 16 illustrates an exemplary computer-implemented method of auto insurance and homeowners insurance virtual user experience applications; and FIG. 17 illustrates another computer-implemented method of auto insurance and homeowners insurance virtual user experience applications.

Figure 1:
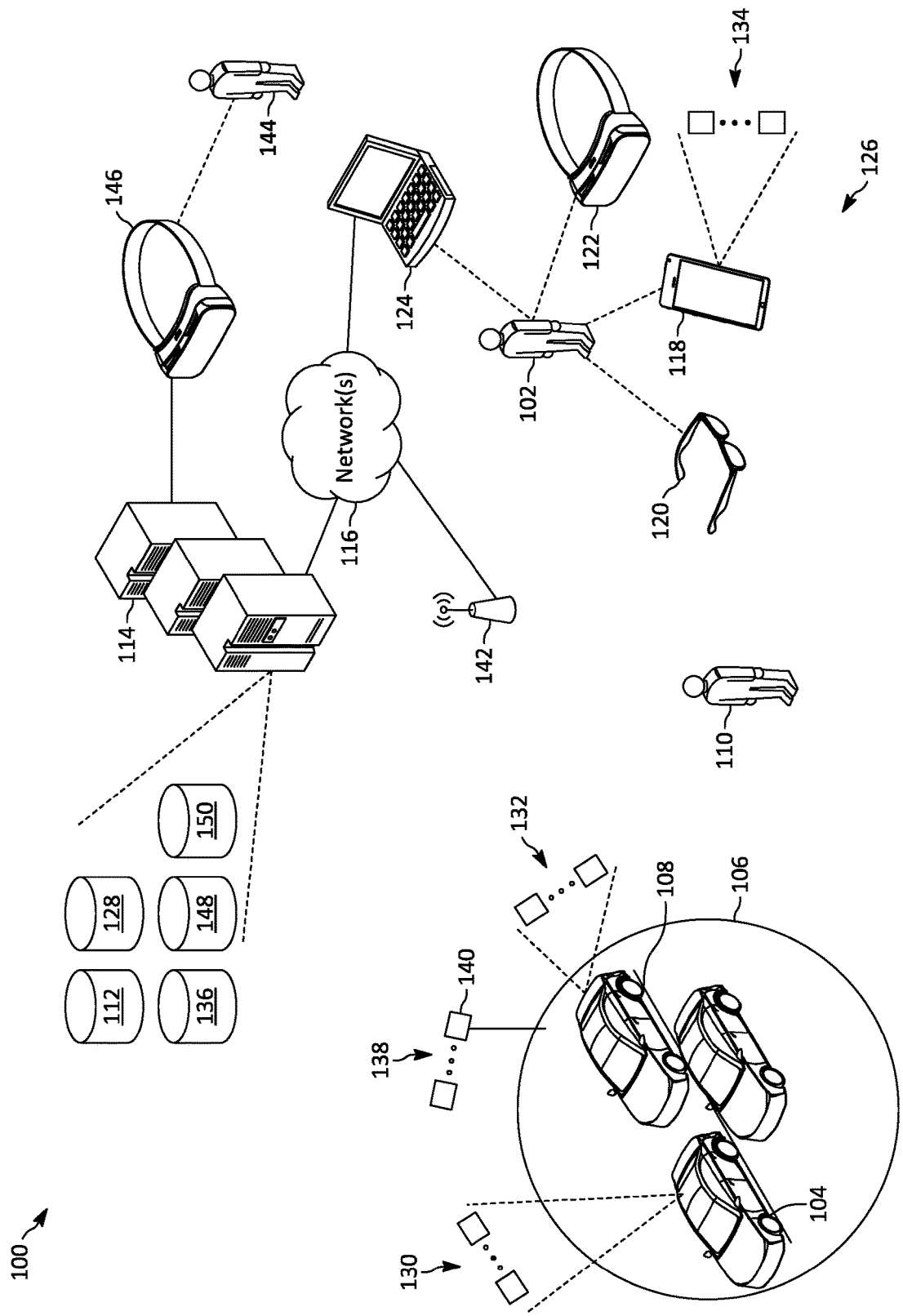
FIG. 1 is a schematic diagram of an exemplary XR system for processing vehicle-related insurance claims, in accordance with various embodiments of the present disclosure.

Skilled artisans will appreciate that elements in the Figures are illustrated for simplicity and clarity, and have not necessarily been drawn to scale. For example, the dimensions of some of the elements in the Figures may be exaggerated relative to other elements to help to improve understanding. Moreover, apparatus and method components have been represented where appropriate by conventional symbols in the Figures, showing only those specific details that are pertinent to understanding the embodiments of the present disclosure so as not to obscure the present disclosure with details that will be readily apparent to those of ordinary skill in the art having the benefit of the description herein. Further, wherever possible, the following description refers to the reference numerals included in the following Figures, in which features depicted in multiple Figures are designated with consistent reference numerals.

DETAILED DESCRIPTION

The present embodiments relate, inter alia, to XR devices and XR user experiences for collecting data, such as personal data and XR experience preferences, data related to insurance policies and vehicles, and/or data related to a damage-causing event. The data may be collected via several sources, including an XR device and sensors, and analyzed by a server to provide practical XR applications and improved XR user experiences to users.

As is commonly known and as used herein, XR refers to any virtual environment or real-and-virtual environment wherein at least a portion of human-to-machine or human-to-human interactions are generated using XR technology and/or XR devices. An XR environment may include one or more of augmented reality (AR), mixed reality (MR), virtual reality (VR), or combinations thereof. An XR environment may include one or more visual environments or components, possibly with an audio component (e.g., spoken words of another person or a voice bot) or a text component as well. VR may refer to an immersive user experience, where the user can experience the sensation of a three dimensional (3D) environment without real-world elements/images. AR may refer to an annotation, overlay, or augmentation of text or media content, such as graphics content, onto real-world images, such as photographs or video of a real-world scene, or onto a direct visual impression of the real world, such as may be seen through the transparent glass or plastic portion of smart glasses. MR may refer to an annotation, overlay, augmentation, or mixing of synthetic content, such as computer generated graphics, virtual scenery, virtual images, or other mixed reality content with real-world content, such as real-world photographs or video of a real-world scene. In various embodiments, XR interactions and XR environments disclosed herein may be parts of a network of three-dimensional (3D) virtual worlds, such as a metaverse.

XR devices may generally be any computing device capable of visualizing and presenting virtual content in conjunction with, or separate from, real-world content to create a partial or wholly virtual experience for a user. Example XR devices include a wearable AR headset or smart glasses, a wearable MR headset or smart glasses, a wearable VR headset or smart glasses, smart glasses, a mobile device or tablet, a device having a speaker and microphone, and a device having a text-based interface. An XR device may include one or more input controls, such as physical buttons located on the XR device itself, or one or more physical buttons located on handheld controllers or devices worn on a hand, foot, or other body part (i.e., "worn devices") used in conjunction with the XR device(s).

Handheld controllers or worn devices may include one or more inertia sensors to sense movements, positions, or orientations of a wearer or user, or a body part of a wearer or user. For example, handheld controllers or worn devices may be used to point at, select, activate, or otherwise interact with elements of a user interface presented within a virtual environment via the XR device(s). Input may also be provided using graphical touchscreen inputs on the screen or user interface of the XR device. Input may also be provided using graphical touchscreen inputs on the screen or user interface of a computing device (e.g., a smart phone or personal computer) associated with the XR device.

An XR device may also include audio or text input devices configured to enable an XR environment to include text-based interactions (e.g., user interfaces within the virtual environment for selecting or otherwise entering text, and/or for presenting text), or audio (e.g., one or more speakers and one or more microphones of the XR device, to support spoken interactions). The audio and text input devices may be configured to enable a wearer or user to interact with a chatbot or voice bot, for example. Audio and text input devices may also be used to control the XR device itself to, for example, capture images or video, or annotate images or videos, etc.

In some embodiments, described XR devices may be any commercial XR device, such as a Google Glass® device, a Google Cardboard® device, a Google Daydream® device, a Microsoft Hololens® device, a Magic Leap® device, an Oculus® device, an Oculus Rift® device, a Gear VR® device, a PlayStation® VR device, or an HTC Vive® device, to name a few. In general, each of these example XR devices may use one or more processors capable of visualizing multimedia content in a partial or wholly virtual environment. For example, a Google Cardboard VR device includes a VR headset that uses one or more processors of an embedded smart phone, such as a smart phone, which, in some embodiments, may be a Google Android-based or Apple iOS-based smart phone, or other similar computing device, to visualize multimedia content in a virtual environment.

Other XR devices, such as the Oculus Rift VR device, may include a VR headset that uses one or more processors of an associated computing device, such a personal computer/laptop, for visualizing multimedia images in a virtual environment. The personal computer/laptop may include one or more processors, one or more computer memories, and software or computer instructions for performing the visualizations, annotations, or transmission of multimedia content or VR visualizations as described herein. Still further, other XR devices may include one or more processors as part of a VR headset that can operate independently from the processor(s) of a different computing device for the purpose of visualizing multimedia content in a virtual environment.

While embodiments are described herein with reference to example XR environments and example XR devices, persons of ordinary skill in the art will recognize that disclosed embodiments may be implemented using any combination of past, current, or future XR technologies and/or XR devices. Moreover, for readability, "using XR," "with XR," or similar phrases may be used herein as shorthand for more unwieldy phrases, such as "using one or more XR devices, XR experiences, XR technologies, or XR environments," or similar phrases.

As used herein, an insured party may represent one of one or more persons to which an insurance company provides one or more insurance policies. An insured party may also be an authorized representative of a person, company, business, or organization to which an insurance company provides one or more insurance policies.

Unless expressly stated to the contrary, "or" refers to an inclusive or and not to an exclusive or. For example, "A, B, or C" refers to any combination or subset of A, B, C such as (1) A alone, (2) B alone, (3) C alone, (4) A with B, (5) A with C, (6) B with C, and (7) A with B and with C.

Reference will now be made in detail to non-limiting embodiments, some of which are illustrated in the accompanying drawings.

Exemplary Extended Reality (XR) System

FIG. 1 is a schematic diagram of an exemplary XR system 100, in accordance with various embodiments of the present disclosure. In various embodiments, the example XR system 100 may provide, using one or more XR devices or one or more XR technologies, one or more XR environments or one or more XR experiences that an insured party 102 may use to submit and handle a vehicle-related insurance claim for damage to a vehicle 104 at a damage scene 106 that resulted from a damage-causing event. In the example shown, the vehicle 104 is struck from behind by another vehicle 108.

Other example damage-causing events include a different type of vehicle collision, a vehicle striking a person or object, an object other than a vehicle striking a vehicle, a vehicle leaving a roadway, or a vehicle being subject to hazardous conditions such as ice, snow, rain, fire, high winds, flooding, a hurricane, or a tornado. However, these examples are non-limiting, and the vehicle 104 may instead be damaged by any other kind of event.

Example damage scenes 106 may include a roadway, a parking lot, a parking garage, a vehicle on a transport truck, ship or train, a driveway, or an off-road location. However, the damage scene 106 may be anywhere a vehicle is present, for any purpose (e.g., as a result of operation, or while in storage or being shipped by a larger vehicle, etc.).

In some examples, the insured party 102 is in the vehicle 104 during the damage-causing event, either as an operator or a passenger. However, the insured party 102 may not be in the vehicle 104 during the damage causing event. For example, the vehicle 104 may be parked, or the vehicle 104 may have been operated by another person at the time of an accident.

In some examples, one or more other persons 110 are present at the damage scene 106, and may be witnesses to the damage-causing event or the damage scene 106. In some examples, at least one of the persons 110 is a witness to, or involved in, the damage-causing event. For example, the person 110 may in be another vehicle, such as the vehicle 108 that struck the vehicle 104, or in a vehicle struck by the vehicle 104. However, persons 110 need not be directly involved in the damage-causing event, so long as those persons 110 were in the vicinity of the damage scene 106.

A person 110 may be a witness to the damage scene 106 before, during, or after the damage-causing event. For example, a person 110 may arrive at the damage scene 106 after the damage-causing event has already occurred. While not a witness to the damage-causing event itself, such persons 110 may become aware of conditions associated with the damage-causing event, or damage or injuries resulting from the damage-causing event. Such a witness may be, for example, a government official, a police officer, a security officer, or a person associated with a provider of post-damage event activities or services, such as a representative of an insurance company (e.g., an agent or claims adjuster) that collects information for an insurance claim filed by the insured party 102 for damage or injuries resulting from the damage-causing event. Other examples may include a representative or agent of a remedial or repair service, such as, a tow truck driver or an auto repair representative. It should be understood that the above examples are non-limiting, and that other persons, witnesses or non-witnesses, are contemplated.

In various examples, the party 102, the person(s) 110, or any other persons in the vicinity of the damage scene 106 may (i) capture or otherwise record data 112 relating to the damage-causing event, the damage scene 106, or damages or injuries, and (ii) transmit, transfer, upload, or otherwise provide the captured data 112 to one or more provider servers 114 via any number and/or type(s) of public or private computer networks 116, such as the Internet. The data 112 may be captured or otherwise recorded using real-world interactions or using XR. Example data 112 relating to a damage-causing event represents, or is associated with, the damage scene 106, the damage-causing event, damage to a vehicle 104, damage to other vehicles, areas of the damage-causing event, damage to objects, injuries to persons, events surrounding the damage-causing event, and conditions at the time of the damage-causing event.

For example, a person may capture one or more images or videos of the damage scene 106 before, during, or after the damage-causing event. The images or videos may represent how or why the damage-causing event occurred, who was doing what leading up to the damage-causing event, who was doing what during the damage-causing event, who was doing what after the damage-causing event, damage to the vehicle 104 or any other vehicle, object, or person involved in the damage-causing event, and conditions during the damage-causing event, for example. Images and videos may be captured or recorded the party 102, the person(s) 110, or any other persons using any number and/or type(s) of devices including a camera, a video recorder, a digital camera, a digital video recorder, a mobile phone 118 having a camera, a smart phone, a tablet, smart glasses 120, an XR headset 122, and a personal computer/laptop 124, for example.

In various examples, other data 112 related to the damage-causing event may be obtained from other devices, such as drones, satellites, helicopters, planes, traffic cameras, security cameras, map or satellite databases, weather databases, health or medical insurance systems, for example. In other examples, data 112 related to the damage-causing event may be one or more written or verbal statements made or provided by one or more persons. In some examples, the statements are made to, for example, a government official, a police officer, a security officer, or an insurance company representative, for example. Such statements may be made contemporaneously to the damage-causing event, or made at a later date or time.

In some embodiments, the captured data 112 may have associated metadata that is automatically added to file(s) containing the captured data 112 by, for example, the device(s) used to capture the data 112. Example metadata includes location, orientation, date, and time information that is automatically added to image or video file(s) captured by a computing device having a camera, such as the mobile phone 118, the smart glasses 120, or the headset 122.

Exemplary Extended Reality (XR) Devices

In some embodiments, the insured party 102 may use XR via one or more XR devices 126 to virtually interact, wholly or partially, with the server(s) 114 for processing a vehicle-related insurance claims. For example, the insured party 102 may use one or more of the mobile phone 118, the smart eyeglasses 120, the headset 122, or the computer 124 to use XR to virtually interact with the server(s) 114, and/or representatives associated with the server(s) 114 (e.g., an insurance agent or claim adjuster).

In various embodiments, the XR device(s) 126 may have input controls, such one or more physical buttons located on the XR device(s) 126 themselves, one or more physical buttons located on handheld controllers or worn devices used in conjunction with the XR device(s) 126, audio input devices (e.g., a microphone for voice commands and/or other voice inputs), text input devices (e.g., a virtual or physical keyboard for entering text), or graphical touch-screen inputs on screens or user interfaces of the XR device(s) 126, for example, a screen or user interfaces of the mobile phone 118. Audio input device(s) may be configured to enable audio or spoken interactions in an XR environment (e.g., with a voice bot), in some embodiments. Text input device(s) may be configured to enable text-based interactions in an XR environment (e.g., with a chatbot).

Handheld controllers or worn devices may include inertia sensors to sense movements, positions, or orientations of a wearer or user, or a body part of a wearer or user. For example, handheld controllers or worn devices may be used to point at, select, activate, or otherwise interact with elements of a user interface presented via the XR device(s) 126.

Input controls of the XR device(s) 126 may allow a user, such as the insured party 102, to input data, or select options from menus, lists, selectable graphics, or other items as displayed on a user interface screen of an XR device 126. The input controls may allow a user, such as the insured party 102, to provide commands to the XR device(s) 126, such as (i) when and how to capture images or videos, (ii) how to augment, annotate, or otherwise provide additional details, data, or information associated with captured images or videos, (iii) provide further details, data, or information related to the damage-causing event, or, more generally, (iv) control operation(s) of the XR device(s) 126. For example, the input controls may be used to capture images or videos, and augment captured images or videos with one or more annotations, including any of text-based annotation, voice-based annotations, graphical annotations, video-based annotations, AR annotations, or MR annotations. In some embodiments, the augmentation information may be saved with the associated image or video file, or, in other embodiments, as a separate file or files associated with the image or video.

The XR device(s) 126 may also include one or more output devices, such as one or more displays or speakers that allow the XR device(s) 126 to display or present virtual computer-generated content associated with an XR environment. Exemplary generated content includes visual content, audible content, or combinations thereof. In some examples, only virtual content is presented by an XR device 126 such that a user is fully immersed in an XR environment. Additionally and/or alternatively, the virtual content may be displayed on top of, alongside, or otherwise in combination with real-world content such that a user is only partially immersed in an XR environment.

Other parties (e.g., a person 110) may likewise capture, annotate, transmit, transfer, upload, or otherwise provide their data 112 to the server(s) 114 using XR, as discussed above, or using any other technique for providing captured data 112 to the server(s) 114. However, in some examples, the party 102 may be the only one who captures data 112.

In some embodiments, sensor data 128 may be collected by any number and/or type(s) of sensors associated with, for example, the damage scene 106 or the damage-causing event, and transmitted, transferred, uploaded, or otherwise provided to the server(s) 114 via the network(s) 116. The sensor data 128 may be related to, of representative of, any sensed aspects of the damage scene 106 or the damage-causing event. Exemplary sensors may include one or more sensors 130 associated with the vehicle 104, one or more sensors 132 associated with other vehicles, such as the vehicle 108 that struck the vehicle 104 in the illustrated example, one or more sensors 134 associated with the insured party 102, smart infrastructure sensors, and IoT sensors. Exemplary sensors 130, 132 associated with a vehicle include cameras, positioning sensors (e.g., a global positioning satellite (GPS) receiver), telematics sensors, inertia sensors, road condition sensing sensors, distance-ranging sensors (e.g., a light detection and ranging (lidar) sensor), and sensors for sensing driving behaviors and characteristics. Exemplary sensors 134 may include cameras, positioning sensors, telematics sensors, inertia sensors, orientation sensors, mapping sensors, smart home sensors, and date and time sensors. However, any type(s) of sensors may be used to capture any other type(s) of sensor data 128.

The server(s) 114 may also collect or obtain additional data 136 related to the damage scene 106 or the damage-causing event from any number and/or type(s) of other devices or data sources 138, such as a traffic camera 140, a surveillance camera, a security camera, a weather information data source (e.g., temperature, precipitation, sunrise, sunset, wind, etc. provided by a weather service), a weather service, a weather sensor, a satellite, a drone, a map database, or a street view database.

Exemplary Insurance Provider Server(s)

In some embodiments, the servers(s) 114 may be associated with a provider of post-damage event activities or services, such as an insurance company providing vehicle-related insurance and processing vehicle-related insurance claims. It is to be understood that, while embodiments herein describe the server(s) 114 as associated with an insurance company, the server(s) 114 may, additionally and/or alternatively, be associated with other companies or individuals that may have an interest in providing services or activities related to the damage-causing event, the damage scene 106, damage to the vehicle 104, damage to objects, or injuries to persons. Exemplary other companies or individuals include a remedial service company, a repair company, a health or medical insurance company, or any other company or individual that may benefit or otherwise use the data 112, 128, and 136 related to the damage-causing event or the damage scene 106.

In some embodiments, the XR device(s) 126, the sensors 130, 132, and 134, and the data sources 138 may be communicatively coupled to the network(s) 116 via any number and/or type(s) of wired or wireless networks. For example, the XR device(s) 126, the sensors 130, 132, and 134, or the data sources 138 may be communicatively coupled to the network(s) 116 via any number and/or type(s) of wireless or cellular base stations 142. The base station(s) 142 may be implemented in accordance with any number and/or type(s) of communications standards including Global System for Mobile Communications (GSM), Code Division Multiple Access (CDMA), Universal Mobile Telecommunications System (UMTS), Long Term Evolution (LTE), 3G, 4G, 5G, or the IEEE 802.11x family of standards. Additionally and/or alternatively, the XR device(s) 126, the sensors 130, 132, and 134, and the data sources 138 may be communicatively coupled to the network(s) 116 via any number and/or type(s) of wired interfaces, such as an Ethernet interface. However, the data 112, 128, and 136 may be provided to the server(s) 114 in any other way, including removable storage media or any type(s) of input/output interface, such as a universal serial bus (USB) interface, a near-field communication (NFC) interface, or a Bluetooth® interface.

In some embodiments, the server(s) 114 may receive or obtain the data 112, 128, and 136 in response to a request sent to devices, sensors, or data sources capturing and storing the data 112, 128, and 136. Additionally and/or alternatively, the data 112, 128, and 136 may be provided to the server(s) 114 without it being requested. For example, a user may, solicited or unsolicited, use XR to navigate a virtual user interface provided by the server(s) 114 to submit or transfer data from the user's device(s) to the server(s) 114. The data provided to the server(s) 114 may be in any form, such as digital or digitalized images or videos, annotations, metadata associated with images or videos, or digital representations of written or verbal statements (e.g., scanned or translated).

The provider servers(s) 114 may include any number(s) and/or type(s) of physical server computers or virtual, cloud-based servers, which may operate as a server farm, and may include one or more processors, one or more computer memories, and software or computer instructions for processing vehicle-related insurance claims. The server(s) 114 may be local to, or remote from, the XR device(s) 126 or 144.

In some embodiments, the server(s) 114 generate virtual content, and provide the virtual content to the XR device(s) 126 for presentation to the insured party 102, and receive and respond to input(s) from the insured party 102 via input controls of the XR device(s) 126 to create one or more interactive XR experiences that enable the insured party 102 to submit and handle a vehicle-related insurance claim use XR interactions.

In various embodiments, the server(s) 114 may provide or support one or more interactive XR experiences that enable the insured party 102 to provide the data 112 related to a damage-causing event. For example, the XR device(s) 126 may be used to provide an AR experience that enables the insured party 102 to view real-world content, capture real-world content as images or videos, and augment captured content with annotations. Exemplary annotations include indications of what part of the vehicle 104 was damaged, the positions of the vehicle 104 and other vehicles or objects in a damage scene, what was happening when a damage-causing event occurred, what happened after a damage-causing event, conditions at the time of the damage-causing event, etc.

In some embodiments, the server(s) 114 may also provide or support one or more interactive XR experiences that enable the insured party 102 to provide data representing themselves. For example, the server(s) 114 may provide or support one or more XR user interfaces that enable the insured party 102 to indicate or provide personal data, such as username, password, telephone number(s), social media data, financial account data, insurance policy(-ies), insured assets (e.g., the vehicle 104), etc. The provided data may also represent XR preferences, XR interaction preferences (e.g., prefer to use VR over AR, only use AR, a preferred avatar, preferred metaverse or other setting/scene for virtual meetings to take place, etc.), type(s) of or identifier(s) for insured party's XR device(s), willingness to hold virtual meetings (rather than real-world meetings) with an insurance representative 144 (e.g., an insurance agent or claim adjuster), etc. The server(s) 114 may use such data to access files, accounts, or records associated with the insured party 102, and/or to customize or configure an XR experience in accordance with the insured party's XR preferences.

In some embodiments, the server(s) 114 may use (i) the captured data 112 relating to a damage-causing event, a damage scene, or damages or injuries, (ii) the sensor data 128, or (iii) the additional data 136 obtained from other data sources 138 to process a vehicle-related insurance claim. For example, the data 112, 128, and 136 may be used by an insurance representative 144 to determine who, if anyone, is at fault in a damage-causing event. In some embodiments, the insurance representative 144 may access the data 112, 128, and 136 using their own XR device(s) 146.

In some embodiments, the data 112, 128, and 136 may be used by the server(s) 114 to automatically create or generate a model or virtual reconstruction 148 of a damage-causing event. In some embodiments, the server(s) 114 may provide one or more XR user interfaces that enable the insured party 102 to, via their XR device(s) 126, construct, build, or define the model or virtual reconstruction 148 as they describe the damage-causing event verbally or using movable icons. In some embodiments, the insured party 102 and the insurance representative 144 may meet virtually in a collaborative XR environment or XR experience such that they can collaboratively construct, build, or define the model or virtual reconstruction 148.

In some embodiments, the model or virtual reconstruction 148 may be downloaded to and presented in an insurance representative's XR device(s) 146 to enable the insurance representative 144 to identify which autonomous vehicle (AR) or driver was at fault, or partially at fault, and/or to determine other causes/factors (weather, construction, deer, etc.) contributing to the damage-causing event or the damage scene 106. In some embodiments, the model or virtual reconstruction 148 may also be downloaded to and virtually presented in an insured party's XR device(s) 126 such that the insured party 102 may review, adjust, modify, or approve the model or virtual reconstruction 148 using an XR experience. The model or virtual reconstruction 148 may also be downloaded to and virtually presented in an insurance representative's XR device(s) 146 such that the insurance representative 144 may review, modify, adjust, or approve the model or virtual reconstruction 148 using an XR experience.

In some embodiments, the insured party 102 and the insurance representative 144 may meet virtually in a collaborative XR environment or XR experience such that they can collaboratively review, modify, adjust, or approve the model or virtual reconstruction 148 using XR. In some embodiments, a collaborative XR environment or XR experience may include a virtual meeting of the insured party 102 and the insurance representative 144 in a virtual office or meeting space.

In certain embodiments, the server(s) 114 may cause the verified model or virtual reconstruction 148 to be stored on a distributed ledger, such as a blockchain, for remote viewing and/or to facilitate subrogation, claim processing, dispute resolution, etc. In some embodiments, the server(s) 114 may cause the verified model or virtual reconstruction 148 to be stored on the distributed ledger by sending the verified model or virtual reconstruction 148 to one or more nodes of a plurality of nodes maintaining the distributed ledger. In response and on behalf of the server(s) 114, the one or more nodes may attempt to form a cryptographic consensus as to how the verified model or virtual reconstruction 148 is to be integrated into the distributed ledger, and, if consensus is obtained, provide the verified model or virtual reconstruction 148 to the plurality of nodes such that each node may add the verified model or virtual reconstruction 148 to respective copies of the distributed ledger. Additionally and/or alternatively, the server(s) 114 may be one of the nodes maintaining the distributed ledger, and may work directly with the other nodes to form a cryptographic consensus for the model or virtual reconstruction 148 and, when consensus is obtained, cause the other nodes to store the model or virtual reconstruction 148 on respective copies of the distributed ledger. Certain embodiments may also use computer vision and/or connected infrastructure data to resolve disputes associated with damage-causing events.

In some embodiments, the server(s) 114 may use the second data and the sensor data to determine claim information for an insured party's or insurance representative's review, modification, or approval. The claim information may include one or more of (i) estimated repair or replacement costs, (ii) repair or replacement materials, (iii) a repair reconstruction, (iv) a repair schedule, and/or (v) a pre-populated virtual insurance claim.

In some embodiments, the server(s) 114 may use one or more trained machine learning models to determine the claim information. In some embodiments, for example, one or more first machine learning models may be configured, trained, and used to process inputs from the data 112, 128, and/or 136 to determine outputs that identify a make/model/year of a damaged vehicle, and/or the area(s) of the vehicle that were damaged. Moreover, one or more second machine learning models may be configured, trained, and used to process inputs from the data 112, 128, and/or 136, and data regarding similar vehicles damaged in similar areas, to determine outputs that represent one or more components of the vehicle that have been damaged. Further still, one or more third machine learning models may be configured, trained, and used to process inputs representing costs of repairs or replacements for similar vehicles with similar damage, cost of labor, cost of parts, and/or geographic location of the vehicle, to determine outputs that represent estimated repair and/or replacement costs, and/or repair and/or replacement materials. In some embodiments, some of the first, second, and third machine learning models may be combined. The server(s) 114 may pre-populate an insurance claims based upon the estimated repair or replacement costs, and repair or replacement materials.

In some embodiments, the server(s) 114 may generate one or more visual depictions 150 of the claim information. The visual depiction(s) 150 may be downloaded to and presented in an insurance representative's XR device(s) 146 such that the insurance representative 144 may review the visual depiction(s) 150, and adjust, modify, or approve the claim information. The visual depiction(s) 150 may also be downloaded to and presented in an insured party's XR device(s) 126 such that the insured party 120 can review the visual depiction(s) 150, and adjust, modify, or approve the claim information. In some embodiments, the insured party 102 and the insurance representative 144 may meet virtually in a collaborative XR environment or XR experience such that they can collaboratively review the one or more visual depiction(s) 150, and adjust, modify, or approve the claim information.

Exemplary Captured Images

Figure 2:
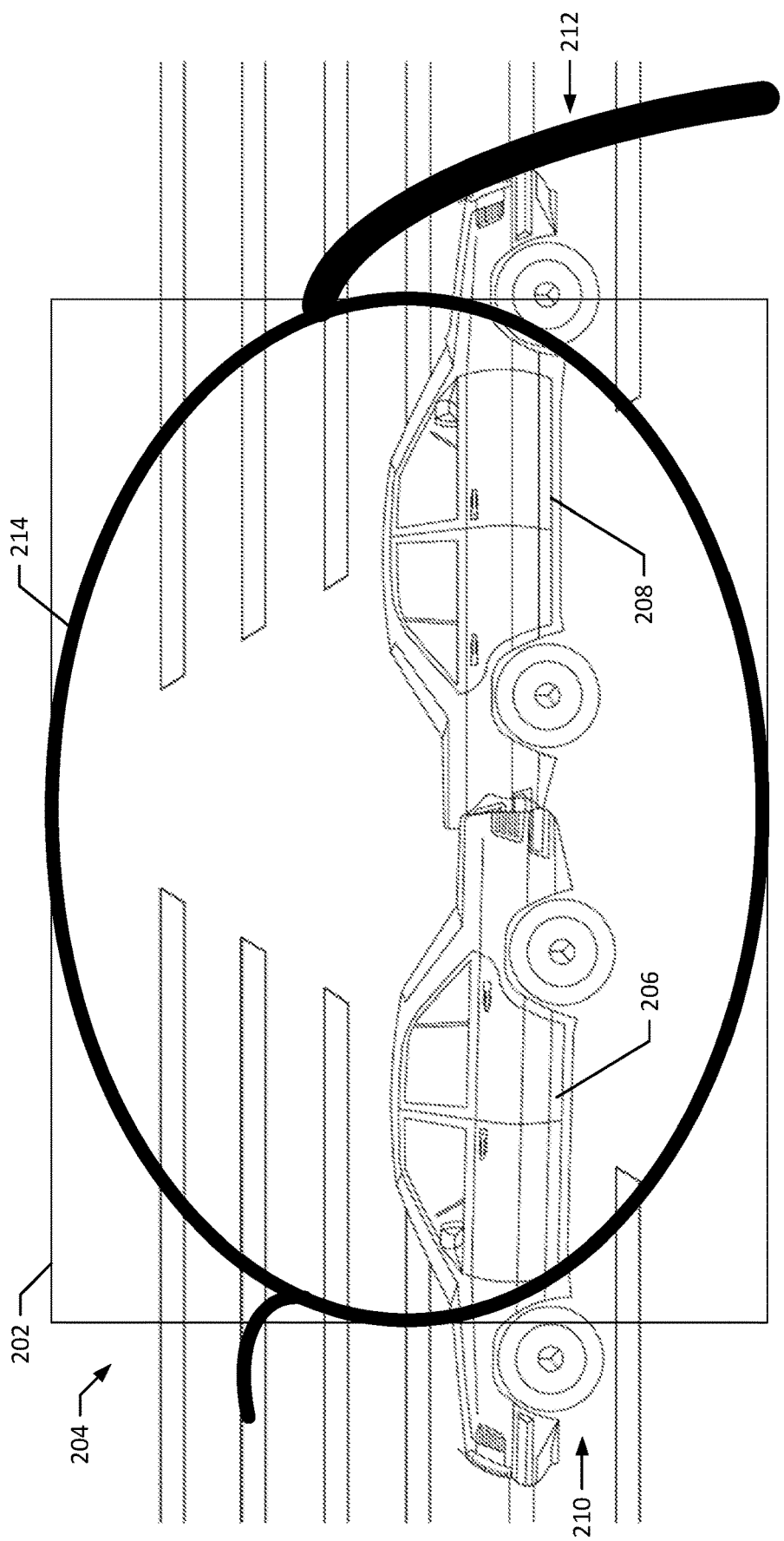
FIG. 2 is an image of an exemplary damage scene of an exemplary damage-causing event.

FIG. 2 is an image 202 of an exemplary damage scene 204 in which two vehicles 206, 208 have collided in a parking lot. More specifically, the exemplary damage-causing event depicted in FIG. 2 occurred when the two vehicles 206 and 208 simultaneously backed out of respective parking spaces 210 and 212, and into each other. As depicted, the image 202 may be captured using smart glasses 214, for example. The smart glasses 214 may include one or more input controls, such as those described above in connection with FIG. 1, that a wearer of the smart glasses 214 (e.g., the insured party 102) may use to control the smart glasses 214 to capture the image 202. The image 202 may form part of captured data 112 relating to the depicted damage-causing event.

Figure 3:
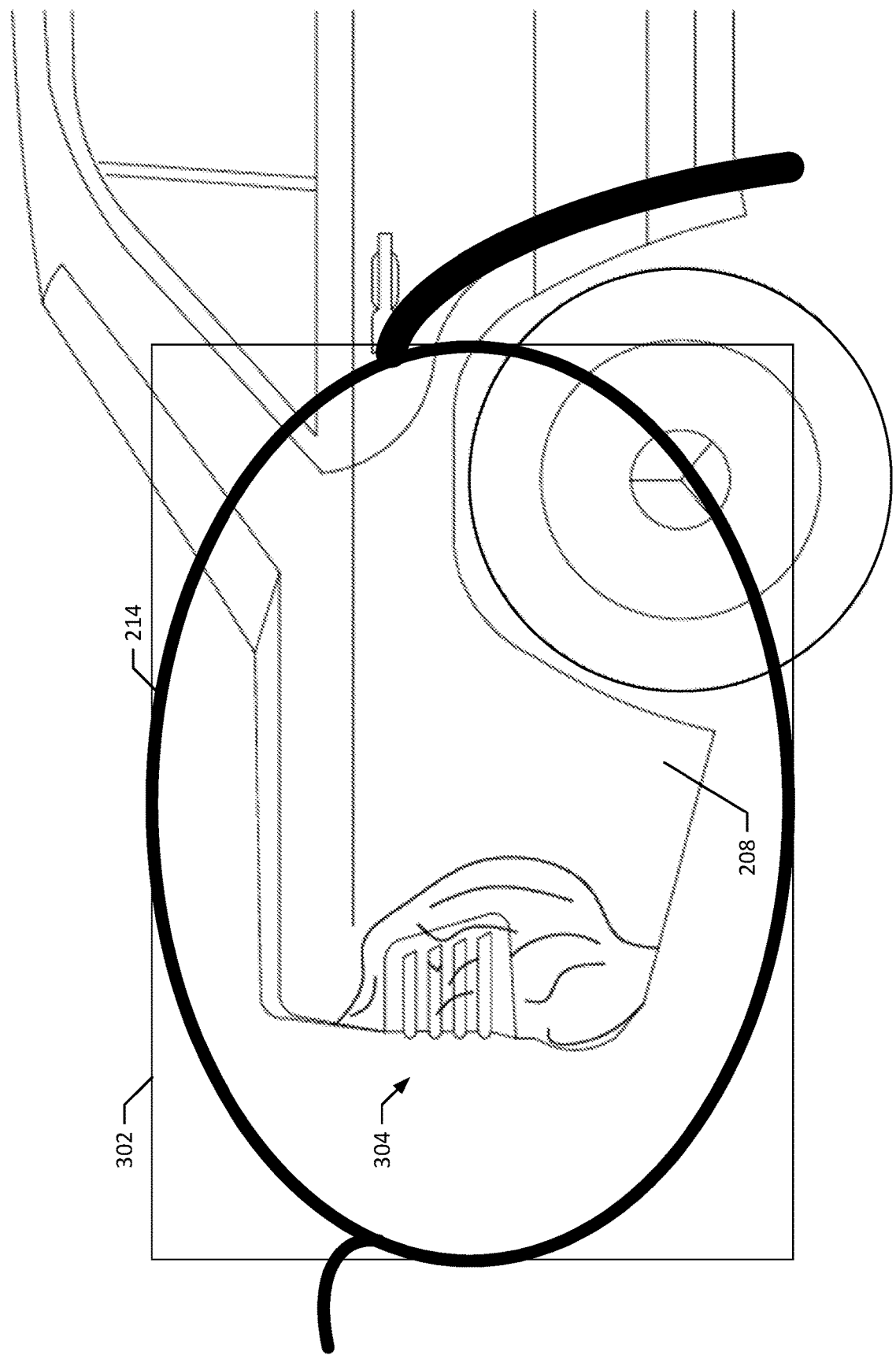
FIG. 3 is an image of exemplary damage resulting from the damage-causing event of FIG. 2.

FIG. 3 is an image 302 of exemplary damage 304 to the vehicle 208 resulting from the damage-causing event depicted in FIG. 2. The exemplary image 302 may be, for example, the result of the user using one or more input controls of the smart glasses 214 to cause the smart glasses 214 to capture the image 302 after, for example, the vehicles 206 and 208 have been moved apart such that the user can move or position themselves to take the image 302 of the damage 304, or after the user moves to a location where the damage is visible. The image 302 may form part of captured data 112 relating to the depicted damage-causing event.

Figure 4:
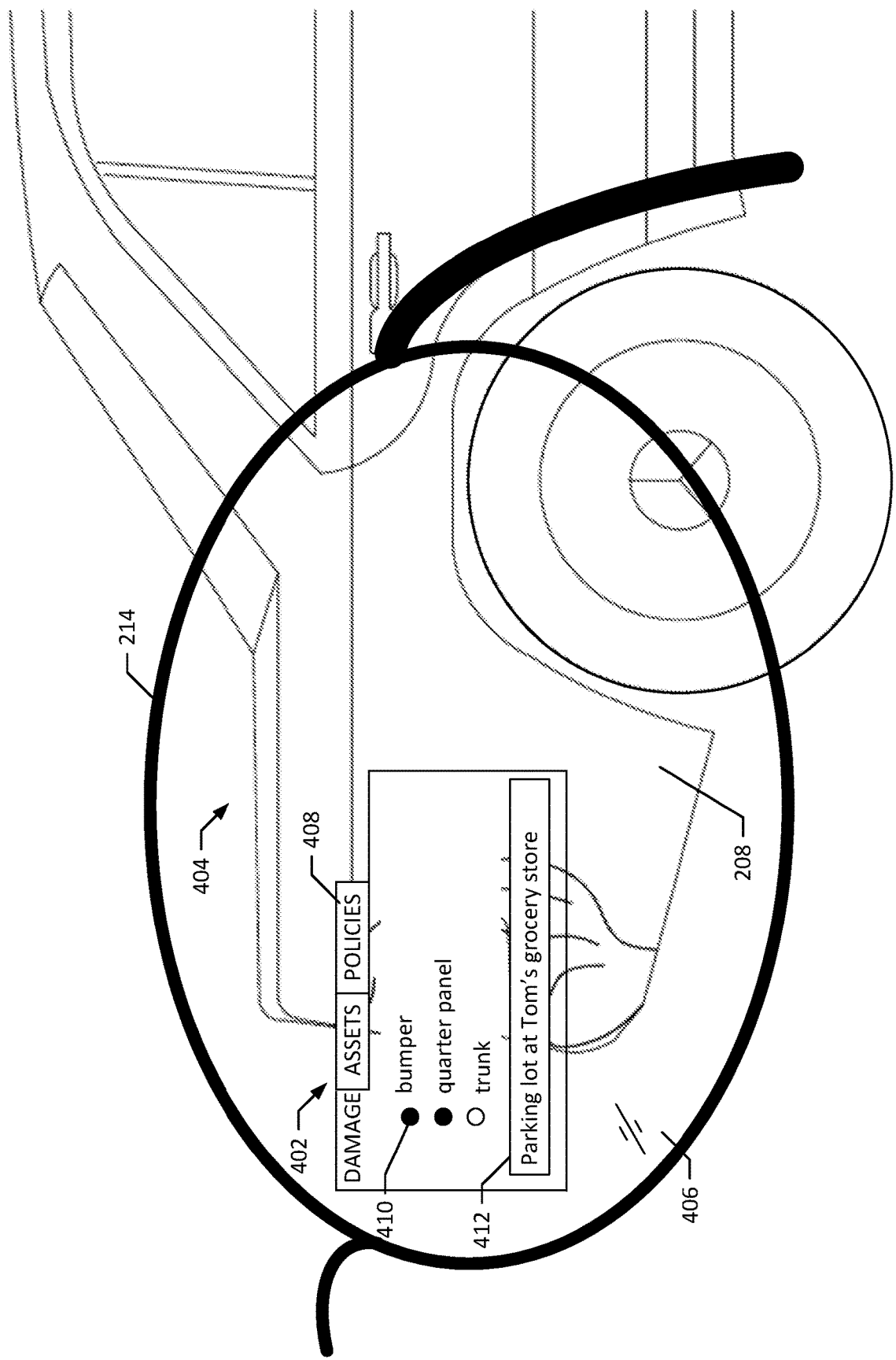
FIG. 4 illustrates an exemplary user interface for annotating the image of FIG. 3.

FIG. 4 illustrates an exemplary user interface 402 that may be presented on the smart glasses 214. The user interface 402 may be presented in addition to, or overlaid on, real-world content 404 viewable through a lens 406 of the smart glasses 214 in an augmented reality fashion. The user interface 402 may include any number and/or type(s) of interface elements including tabs 408, check boxes 410, or text entry boxes 412, for example. In the depicted example, a selected tab 408 enables the insured party 102 to provide information regarding the damage 304, the check boxes 410 enable the insured party 102 to indicate which parts of the vehicle 208 appear to be damaged (e.g., bumper and quarter panel, but not the trunk), and the text box 412 enables the insured party 102 to enter location information for the damage-causing event (e.g., in the parking lot at Tom's grocery store). The insured party 102 may enter text into the text box 412 by speaking the words of the desired text, writing the text using a handheld controller or worn device, or operating a physical keyboard or operating a virtual keyboard using a handheld controller or worn device, for example.

The insured party 102 may use other tabs 408 to provide, for example, asset information (e.g., information relating to the damaged vehicle 208), or insurance policy information (e.g., a policy number, person or company to which the policy was issued, etc.) It should be understood that a user interface 402 may be arranged in any way, depending upon the functionality(-ies) provided by the user interface 402. In some examples, the user interface 402 may include one or more controls that enable a user to annotate, for example, the image 302 (e.g., as discussed below with reference to FIG. 5).

Figure 5:
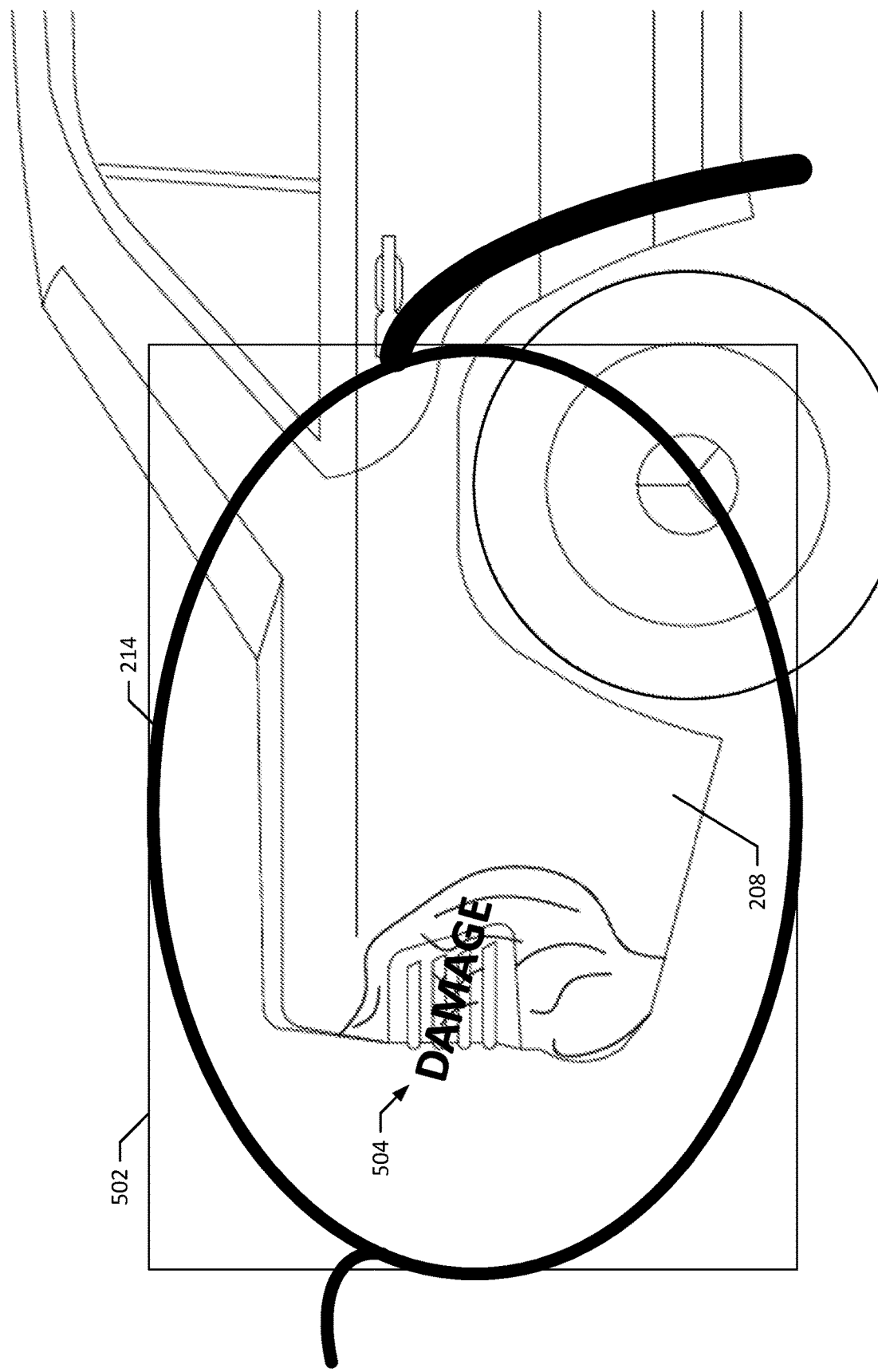
FIG. 5 illustrates an exemplary annotated version of the image of FIG. 3.

FIG. 5 illustrates an exemplary annotated image 502 resulting from the addition of an annotation 504 to the image 302 of FIG. 3. In the depicted example, the annotation 504 is "DAMAGE" as a text annotation. However, any number and/or type(s) of additional and/or alternative annotations may be made to an image.

Annotation(s) 504 may be made using one or more input controls of the smart glasses 214, such as those described above in connection with FIG. 1, or one or more user interface(s) presented on the smart glasses 214, such as the user interface 402. For example, the insured party 102 may point, by manipulating a handheld controller or worn device, at the damage 304 to the vehicle 208, and then speak "add annotation" and "Damage" (or speak then point, etc.).

Additionally and/or alternatively, the insured party 102 may point at the image 302 in the vicinity of the damage 304 such that corresponding text entry box (e.g., similar to the text entry box 412) is presented to enable the insured party 102 to enter text. The insured party 102 may then enter text into the text box by speaking the words of the desired text, writing the text using a handheld controller or worn device, or operating a physical keyboard or a virtual keyboard using a handheld controller or worn device, for example.

The insured party 102 may also make an annotation by virtually drawing on the image 302 using a handheld controller or worn device (e.g., drawing stick figures representing the location of people according to his or her memory of the event, or drawing arrows indicating the direction of movement of a vehicle or person, etc.). However, any method of making annotations may be used. The annotated image 502 may form part of captured data 112 relating to the depicted damage-causing event.

Figure 6:
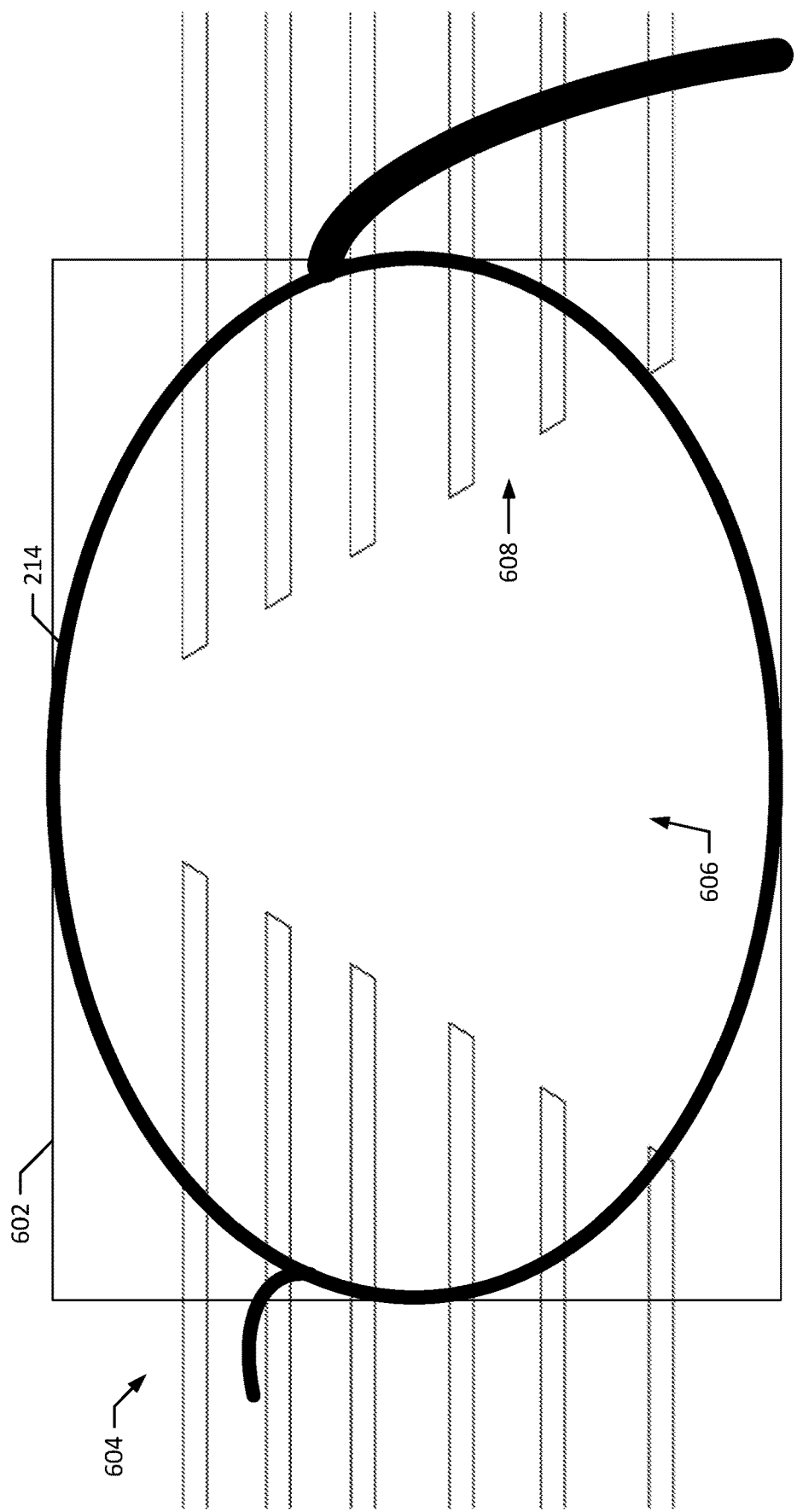
FIG. 6 is an image of an exemplary environment in which the damage-causing event of FIG. 2 occurred.

FIG. 6 is an image 602 of the environment or area 604 in which the damage-causing event of FIG. 2 occurred. The example image 602 may be captured using one or more input controls of the smart glasses 214 to control the smart glasses 214 to capture the image 602, for example. The image 602 may be captured to represent a context or environment for the damage-causing event of FIG. 2. The image 602 represents that the area 604 includes a driving lane 606 bordered on both sides by a plurality of parking spaces 608. The server(s) 114 may use the image 602, for example, as a starting point to generate a virtual reconstruction 148 and then add the vehicles 206 and 208 in their initial locations. The server(s) 114 may then virtually move the vehicles 206 and 208 in the virtual reconstruction 148 until they collide. The image 602 may also form part of captured data 112 relating to the depicted damage-causing event. In some examples, the insured party 102 may annotate the image 602, as described above, to indicate starting locations of the vehicles 206 and 208, to indicate how each vehicle 206, 208 moved, or to indicate the location at which they collided, etc.

Exemplary Virtual Reconstructions

Figure 7:
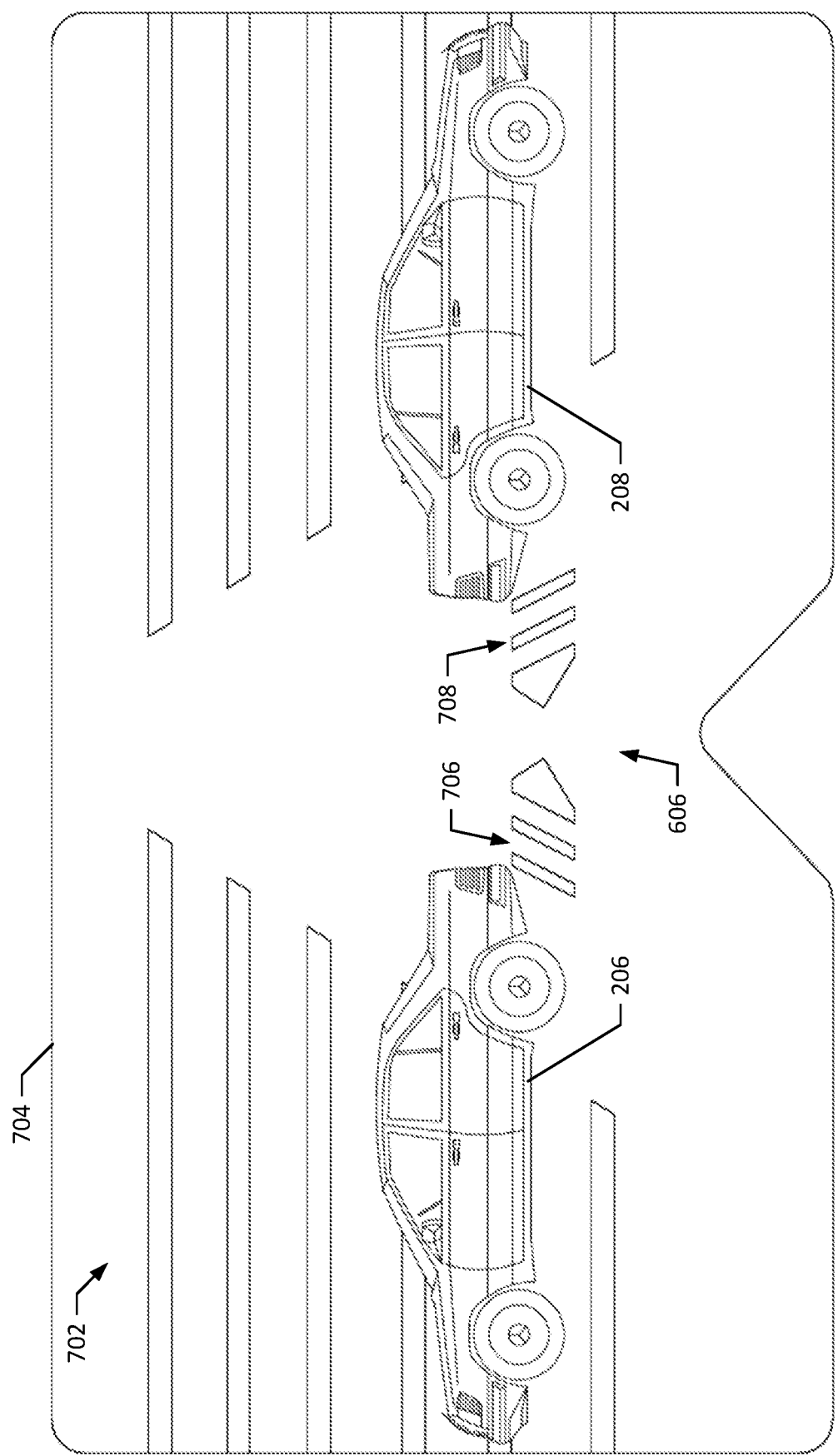
FIG. 7 illustrates an exemplary virtual reconstruction of the damage-causing event of FIG. 2 from a first perspective.

FIG. 7 illustrates an exemplary virtual reconstruction 702 of the exemplary damage-causing event of FIG. 2 from a first perspective representing a view along the driving lane 606. As depicted, the virtual reconstruction 702 may be presented using an XR headset 704. In some embodiments, the server(s) 114 may automatically create or generate the virtual reconstruction 702 based upon the data 112, 128, and 136.

The server(s) may generate the virtual reconstruction 702 based upon one or more of the images 202, 302, 502, and 602, and possibly also other information (e.g., sensor data 128). For example, the server(s) 116 may use the image 602 as a starting point for generating a virtual reconstruction 148, as noted above. The server(s) 114 may then add (e.g., based upon annotations made to the image 602 as discussed above) virtual representations of the vehicles 206 and 208 at their initial locations, and virtually move the vehicles 206, 208 within the virtual reconstruction 148 as indicated (e.g., as indicated by the annotations to the image 602) until they collide at the designated (or observed, in image 202) collision location.

In some embodiments, the server(s) 114 may instead infer how the vehicles 206, 208 were positioned and moved based upon differences between the images 202 and 602. Additionally or alternatively, the server(s) 114 may infer how the vehicles 206, 208 were positioned and/or moved using speech/text recognition (possibly followed by a natural language processing (NLP)) to convert one or more spoken or textual descriptions of the damage-causing event. The insured party 102 may provide such descriptions in response to an insurance representative asking questions regarding the damage-causing event. In some embodiments, the virtual representations of the vehicles 206, 208 are based upon the appearance of the vehicles 206, 208 in the image(s). The server(s) 114 may also generate the virtual representations based upon user-indicated or automatically identified (e.g., based upon the images 202 and 302) types, colors, etc. of the vehicles 206, 208.

In the depicted example, the virtual reconstruction 702 is a static representation of the damage-causing event, and includes annotations 706 and 708 that represent how the vehicles 206 and 208 moved leading up to the damage-causing event, i.e., the collision of the vehicles 206 and 208. In some embodiments, the server(s) 114 automatically generates the annotations 706 and 708 based upon differences between the images 202, 302, 502, and 602, and/or based upon one or more annotations made to the images 202, 302, 502 and 602 by, for example, the insured party 102. Alternatively, the annotations 706, 708 may be substantially the annotations made by the insured party 102 to, for example, the image 602.

In other embodiments, the virtual reconstruction 702 may be a computer-generated animated reconstruction of the damage-causing event such that, when the virtual reconstruction 702 is played, the vehicles 206 and 208 move within an XR experience presented by the XR headset 704 such that a viewer feels as if they, wholly or partially, are a witness to the damage-causing event as it occurs.

In some embodiments, the server(s) 114 may create, change, alter, add, delete, or otherwise modify aspects of the virtual reconstruction 702 based upon one or more input controls of the XR headset 704, handheld controllers, worn devices, or one or more user interfaces presented in the XR headset 704. For example, the server(s) 114 may modify the virtual reconstruction 702 in response to gestures that the insured party 102 and/or the insurance representative 144 made using handheld controller(s) or worn device(s) to virtually change the position(s) of the vehicles 206, 208, to adjust how the vehicles 206, 208 moved, to adjust the direction(s) the vehicles 206, 208 moved, etc.

Additionally and/or alternatively, the server(s) 114 may modify the virtual reconstruction 702 responsive to one or more voice commands, spoken or written statements, text inputs, or user interface element activations made by the insured party 102 and/or the insurance representative 144.

For example, the insured party 102 may, while viewing the virtual reconstruction 148, indicate that "the light was still red at this point," or "the blue car was going faster than that." The server(s) 114 may use speech/text recognition and/or NPL to interpret commands and statements to determine and make one or more changes to the virtual reconstruction 148, and then present the updated virtual reconstruction 148.

Figure 8:
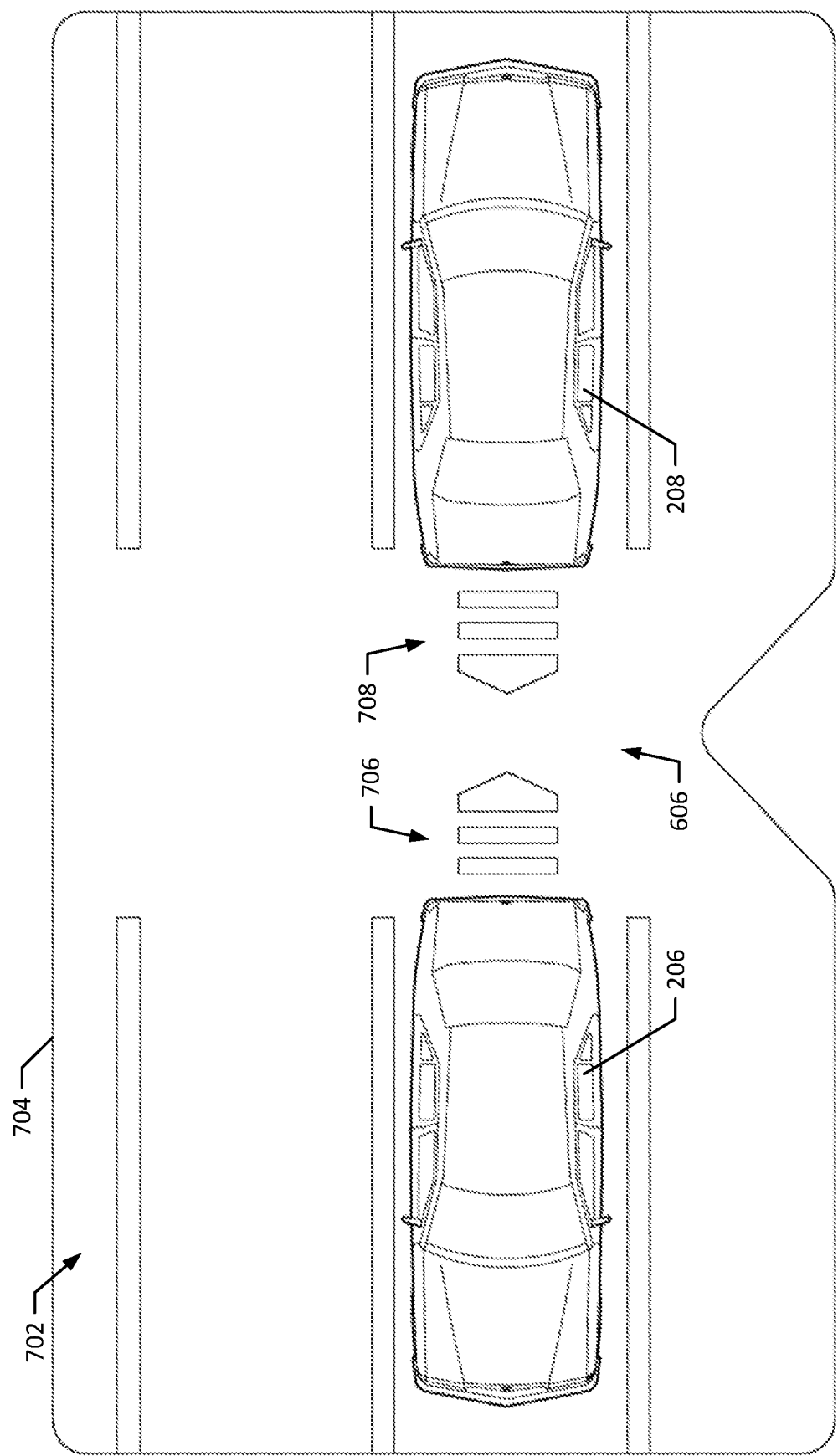
FIG. 8 illustrates the exemplary virtual reconstruction of FIG. 7 from a second perspective.

FIG. 8 illustrates the exemplary virtual reconstruction 702 of FIG. 7 viewed from a second, different perspective representing a top view of the damage-causing event. While the virtual reconstruction 702 is a static reconstruction it may, alternatively be an animated reconstruction, as discussed above in connection with FIG. 7. In some embodiments, the insured party 102 and/or the insurance representative 144 may switch between different perspectives of a virtual reconstruction (e.g., between the example perspectives of FIGS. 7 and 8) using one or more input controls of the XR headset 704, handheld controllers, worn devices, or one or more user interfaces presented in the XR headset 704. For example, they may switch between perspectives using voice commands, such as "switch perspectives," "next perspective," etc. As another example, the insured party 102 and/or the insurance representative 144 may switch between different perspectives of a virtual reconstruction by physically moving (e.g., walking from one area to another in the real-world, while wearing an XR headset, holding a device, or wearing a device that includes inertial, orientation, or position sensors to detect the user's movements and/or location).

Exemplary Virtual Meetings

Figure 9:
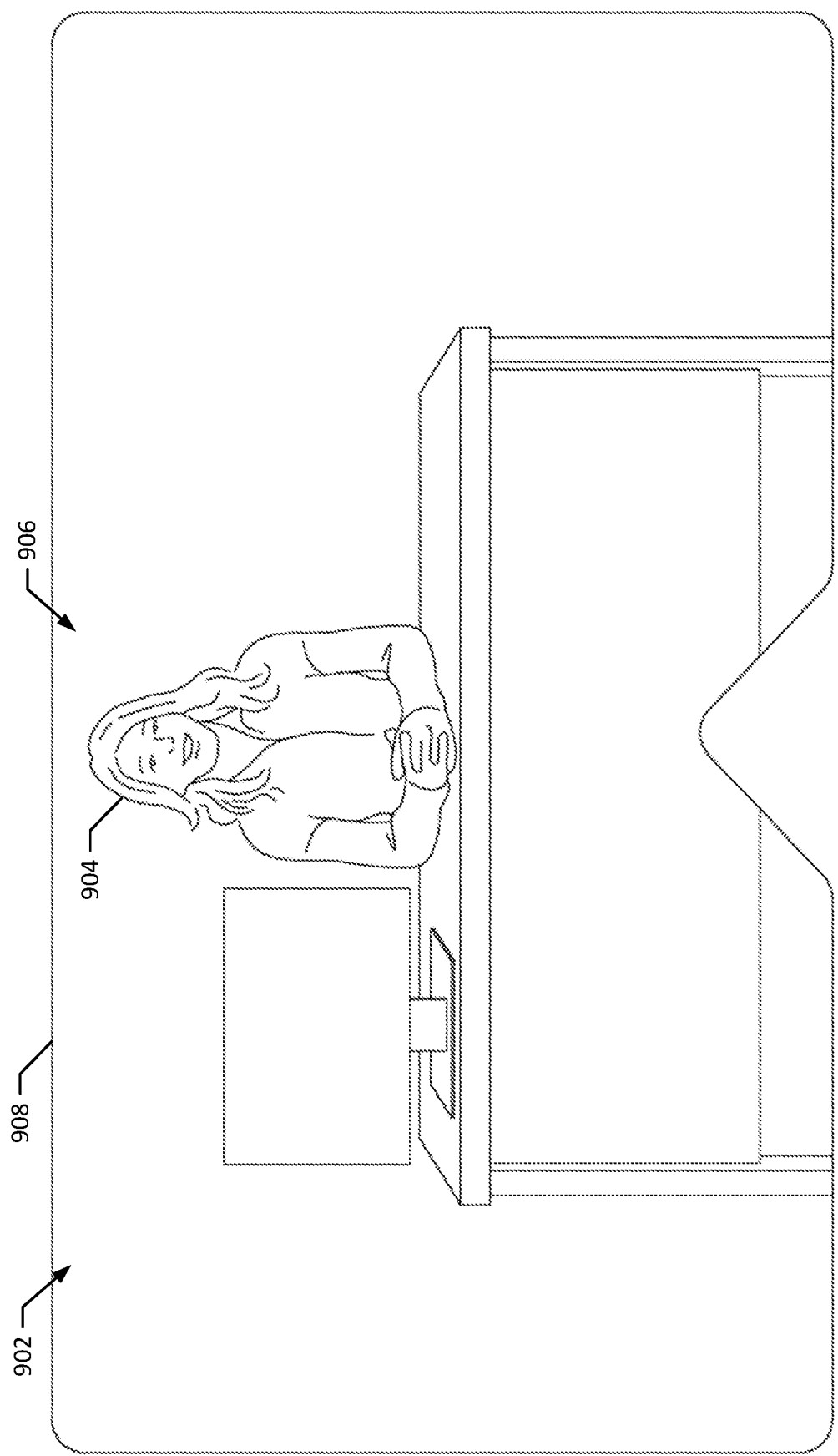
FIG. 9 illustrates an exemplary virtual meeting of an insured party with an insurance representative from the perspective of the insured party.

FIG. 9 illustrates an exemplary virtual meeting 902 of an insured party 102 with an avatar 904 for, or another representation of, an insurance representative 144 from the perspective of the insured party 102. As depicted, the insured party's perspective 906 of the virtual meeting 902 may be presented using an XR headset 908 worn by the insured party 102, such that the insured party 102 may interact virtually with the avatar 904 for the insurance representative 144.

Figure 10:
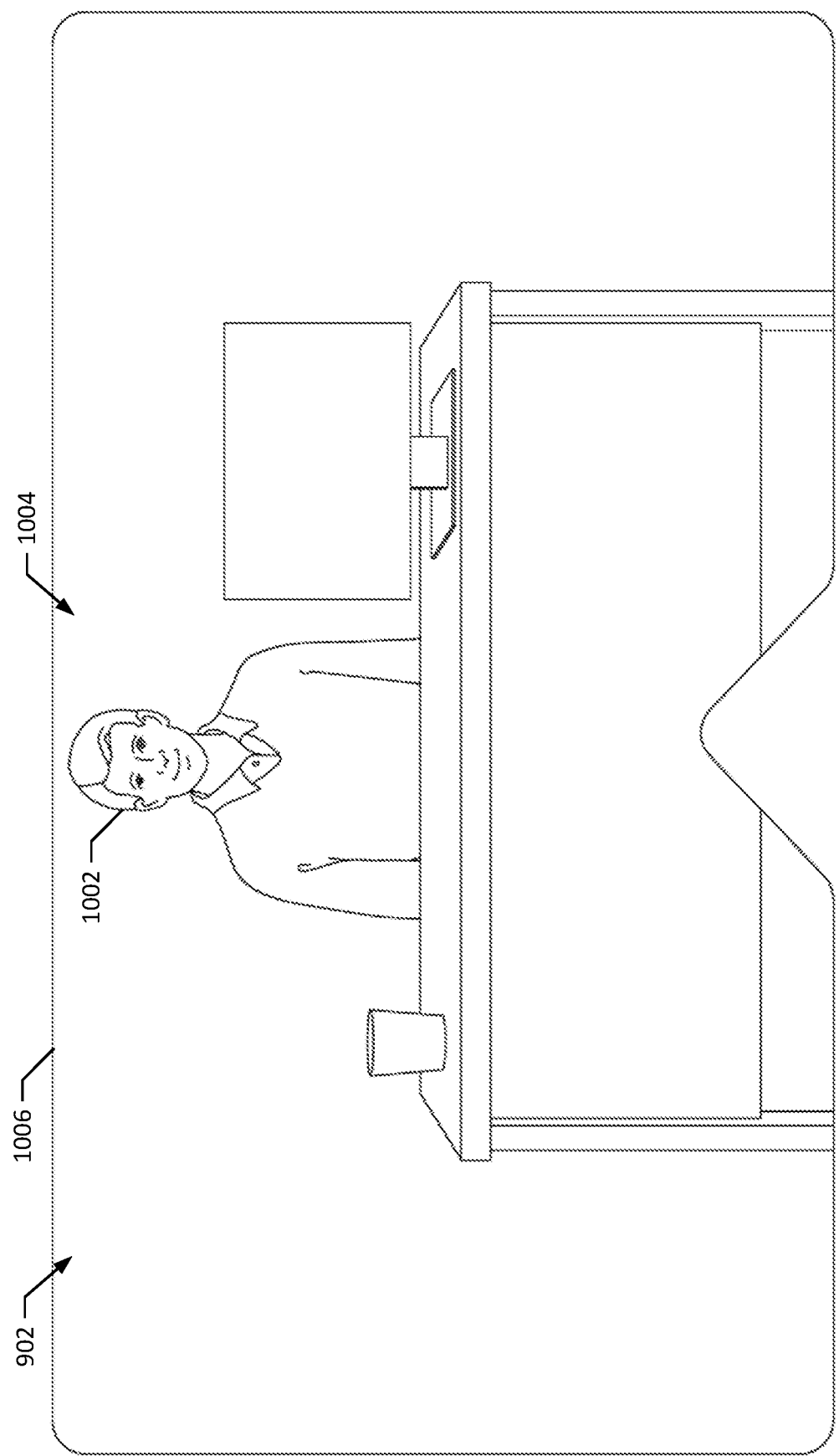
FIG. 10 illustrates the exemplary virtual meeting of FIG. 9 from the perspective of the insurance representative.

FIG. 10 illustrates the exemplary virtual meeting 902 of FIG. 9 from the perspective of the insurance representative 144 looking at an avatar 1002 for, or another representation of, the insured party 102. As depicted, the insurance representative's perspective 1004 of the virtual meeting 902 may be presented using an XR headset 1006 worn by the insurance representative 144, such that the insurance representative 144 may interact virtually with the avatar 1002 for the insured party 102.

In some embodiments, the virtual meeting 902 may occur in a virtual office or meeting space that mimics a real person-to-person meeting that may occur in a real office or meeting space. In some embodiments, the virtual meeting 902 may include a collaborative XR environment or XR experience that the insurance representative 904 and the insured party 1002 can use to collaboratively construct, build, or define a model or virtual reconstruction 148, or review, adjust, modify, and/or approve a model or virtual reconstruction 148, of a damage-causing event, for example. In some embodiments, the virtual meeting 902 may include XR experiences for the insurance representative 904 and the insured party 1002 such that they are together virtually as witnesses to the virtual reconstruction 148. In some embodiments, the virtual meeting 902 may be used by the insurance representative 904 or the insured party 1002 to review one or more visual depictions 150 of claim information, and adjust, modify, or approve the claim information. In the depicted virtual meeting 902, the insured party 102 interacts with a physical insurance representative 144 via the latter's avatar 904. However, the avatar 904 need not be associated with a real person, such that the insured party 102 may instead interact with a computer-generated persona of a virtual insurance representative (e.g., an avatar for a voice bot or chatbot). While example uses of the virtual meeting 902 have been described, the virtual meeting 902 may instead be used for other purposes.

The virtual meeting 902 or other XR experiences and interactions provided by, for example, the server(s) 114 may be configured according to the insured party's personal data and/or XR preferences. The personal data may include notification preferences (e.g., phone vs. text vs. email), username, password, telephone number(s), social media data, financial account data, insurance policy(-ies), insured assets (e.g., the vehicle 104), etc. The XR preferences may include any preferences related to XR experiences and interactions including, for example, interaction preferences (e.g., prefer to use VR over AR, only use AR, preferred avatar, preferred metaverse or other setting for a virtual meeting, etc.), type(s) of or identifier(s) for insured party's XR device(s), willingness to hold virtual meetings (rather than real-world meetings) with an insurance representative 144, where or how the insured party 102 prefers to meet (e.g., virtual home or virtual office in a metaverse, with the representative's avatar 904 in the insured party's actual home or place of business using AR, or in another setting such as outdoors, at the beach, in the woods, during a stroll, etc.), preferred time(s) or days-of-week to meet, etc.

In some embodiments, the insured party 102 receives a notification of, or invitation to, an XR interaction or virtual meeting according to their notification preferences. For example, they may receive a text notification with a link to initiate an XR interaction or virtual meeting. In some embodiments, the notification or invite may correspond to a scheduled time for a virtual meeting or XR interaction, such as when two live, real persons will participate in the virtual meeting or XR interaction. However, some notifications or invitations may be activated at any day or time, such as when the insured party 102 will be the only live, real person in the virtual meeting or XR interaction. In some embodiments, the server(s) 114 may collect the insured person's personal data and/or XR preferences when the insured party 102 interacts with the server(s) 114 to provide the data 112, 128, or 136 using XR. Additionally and/or alternatively, the XR preferences may be provided to the server(s) 114 when the insured party 102 responds to an invitation to an XR interaction or virtual meeting.

Exemplary Computer-Implemented Methods

Figure 11:
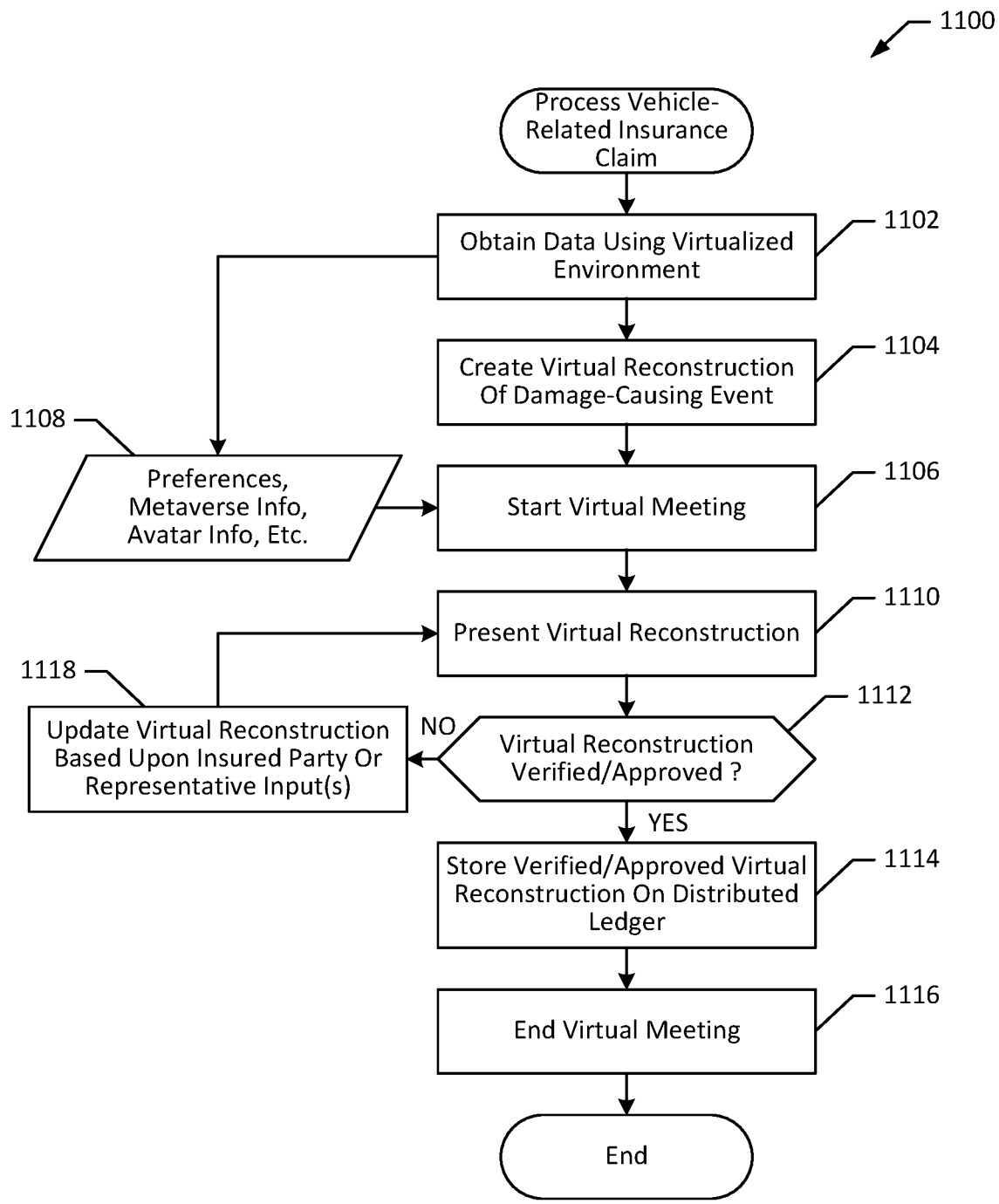
FIG. 11 is a flow diagram for an exemplary computer-implemented method for processing a vehicle-related insurance claim.

FIG. 11 is a flowchart representative of an exemplary computer-implemented method 1100 representing hardware logic, machine-readable instructions, or software that may be implemented or executed by the server(s) 114 to use XR for processing a vehicle-related insurance claim, as disclosed herein. Any or all of the blocks of FIG. 11 may be executable program(s) or portion(s) of executable program(s) embodied in software and/or machine-readable instructions stored on non-transitory, machine-readable storage media for execution by the server(s) 114 or, more generally, one or more processors, such as the processor 1302 of FIG. 13. Additionally and/or alternatively, any or all of the blocks of FIG. 11 may be implemented by one or more hardware circuits structured to perform the corresponding operation(s) without executing software or instructions. The method 1100 is described below with reference to various components or parties of FIG. 1.

The method 1100 may start with the server(s) 114 obtaining, using one or more XR environments provided on an insured party's XR device(s) 126, data related to an insured party 102 or a damage-causing event, such as the exemplary data 112, 128, and 136 (block 1102). Embodiments for obtaining the data and/or providing the data are described above in connection with FIGS. 1-6. For example, the server(s) 114 may download one or more XR environments to one or more XR devices 126 that an insured party 102 may use to capture and/or annotate one or more images or videos of a damage-causing event, a damage scene, a damaged area of a vehicle, etc.

In some embodiments, the server(s) 114 may process the data obtained at block 1102 to automatically create or generate a model or virtual reconstruction 148 of the damage-causing event (block 1104). Embodiments for generating the model or virtual reconstruction 148 are described above in connection with FIGS. 1-8. For example, the server(s) 114 may use the image 602 as a starting image or video frame of a virtual reconstruction 148, add (e.g., based upon annotations made to the image 602) virtual representations of the vehicles 206 and 208 at their starting locations, and then virtually move the vehicles 206, 208 within the virtual reconstruction 148 as indicated (e.g., as indicated by the annotations to the image 602) until they collide at the designated or observed collision location.

In some embodiments, the server(s) 114 may instead infer how the vehicles 206, 208 were positioned and moved based upon differences between the images 202 and 602. In other embodiments, the server(s) 114 may infer how the vehicles 206, 208 were positioned and/or moved using speech/text recognition and/or NLP to convert one or more spoken or textual descriptions of the damage-causing event. Such descriptions may be provided in response to an insurance representative asking questions regarding the damage-causing event.

In certain embodiments, the server(s) 114 generate the virtual representations of the vehicles 206, 208 based upon the appearance of the vehicles 206, 208 in the image(s). The server(s) 114 may also generate the virtual representations based upon indicated or automatically identified (e.g., based upon the images 202 and 302) types, colors, etc., of the vehicles 206, 208.

The method 1100 may further include starting a virtual meeting, such as the exemplary virtual meeting 902 of FIGS. 9 and 10, between the insured party 102 and an insurance representative 144 (block 1106). One or more aspects of the virtual meeting 902 may be based upon one or more insured party preferences 1108, such as personal data, social media account information, metaverse preferences and location information, or avatar preferences or information (e.g., as discussed above in connection with FIGS. 9 and 10). For example, the server(s) 114 may configure and generate one or more XR environments based upon the insured party's personal data and/or XR preferences, send a virtual meeting notification or invite, and, when the invite is activated, download the XR environments to the insured party's XR device(s) 126 and/or the insurance representative's XR device(s) 146 to initiate the virtual meeting.

As part of the virtual meeting, or separately, the method 1100 may include the model or virtual reconstruction 148 being downloaded to and presented in the XR device(s) 126 of the insured party 102 and/or the XR device(s) 146 of the insurance representative 144, to enable one or both parties to separately or collaboratively review, adjust, modify, or approve the model or virtual reconstruction 148 during an XR experience (block 1110).

If the model or virtual reconstruction 148 is verified or approved by one or both parties (block 1112), the server(s) 114 can cause the verified or approved model or virtual reconstruction 148 to be stored on a distributed ledger, such as a blockchain (e.g., as described above in connection with FIG. 1), for remote viewing, or to facilitate, subrogation, claim processing, dispute resolution, etc. (block 1114), the virtual meeting may be ended (block 1116), and control may exit from the method 1100.

Returning to block 1112, if the model or virtual reconstruction 148 is not verified or approved (block 1112), the model or virtual reconstruction 148 may be updated, changed, or modified based upon insured party 102 or insurance representative 144 feedback (block 1118), and control may return to block 1110 to present the updated model or virtual reconstruction 148.

Figure 12:
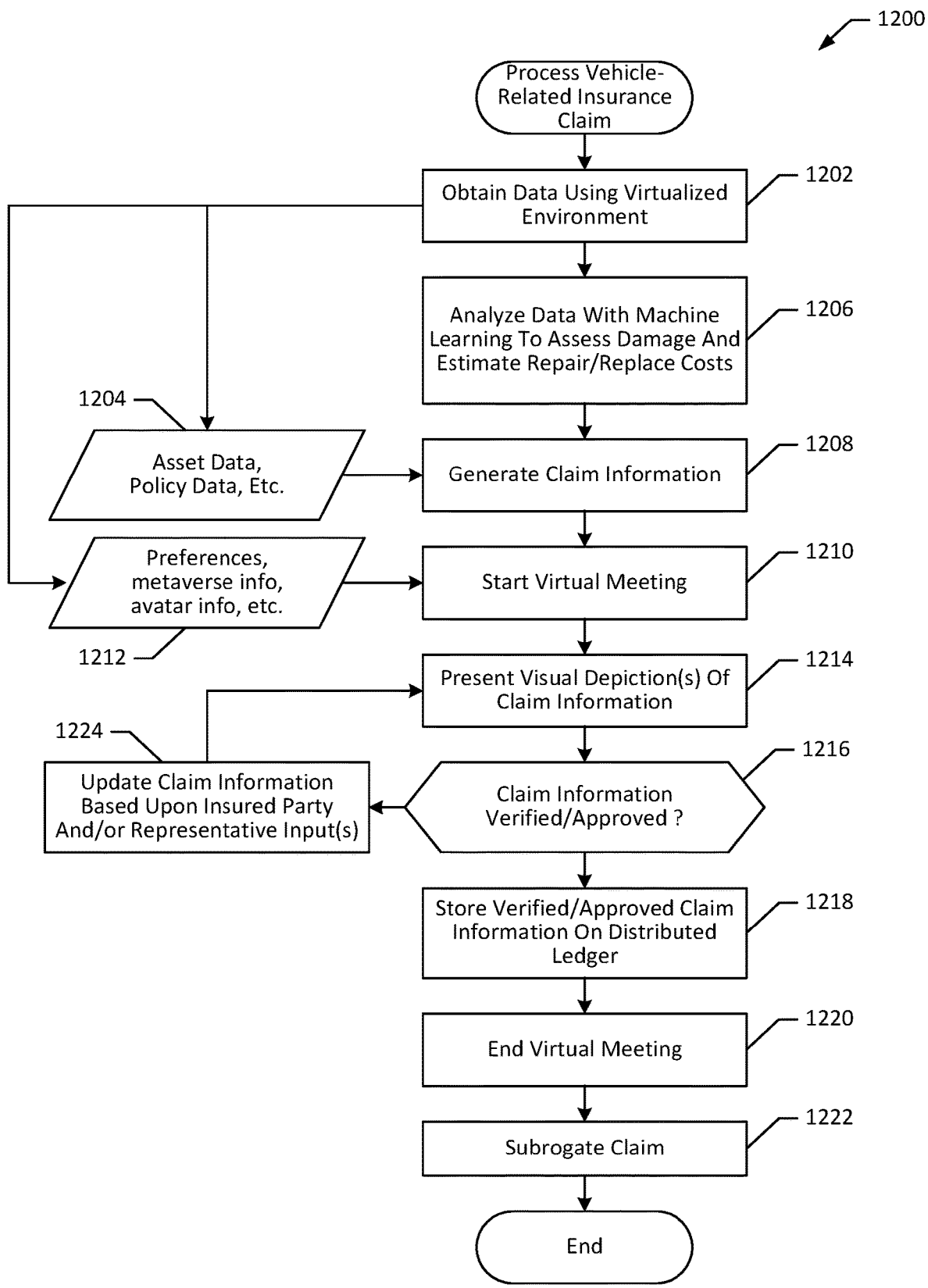
FIG. 12 is a flow diagram for another exemplary computer-implemented method for processing a vehicle-related insurance claim.

FIG. 12 is a flowchart representative of another exemplary computer-implemented method 1200 representing hardware logic, machine-readable instructions, or software that may be implemented or executed by the server(s) 114 to use XR for processing a vehicle-related insurance claim, as disclosed herein. Any or all of the blocks of FIG. 12 may be executable program(s) or portion(s) of executable program(s) embodied in software and/or machine-readable instructions stored on non-transitory, machine-readable storage media for execution by the server(s) 114 or, more generally, one or more processors, such as the processor 1302 of FIG. 13. Additionally and/or alternatively, any or all of the blocks of FIG. 12 may be implemented by one or more hardware circuits structured to perform the corresponding operation(s) without executing software or instructions.

While the exemplary computer-implemented method 1200 is depicted separately from the exemplary computer-implemented method 1100, it should be understood that blocks of method 1200 may be implemented as part of method 1100, or vice versa, such that a model or virtual reconstruction 148, and depiction(s) 150 of claim information, may be presented during the same virtual meeting (e.g., at different points in time during the meeting) for review, adjustment, modification, or approval.

The computer-implemented method 1200 may start with the server(s) 114 obtaining, using one or more XR environments provided on an insured party's XR device(s) 126 at one or more times, data related to an insured party 102 or a damage-causing event, such as the exemplary data 112, 128, and 136 (block 1202). The data may include asset data or insurance policy data 1204.

The method 1200 may include the server(s) 114 processing the data, for example, using one or more trained machine learning models, to assess damage and determine claim information including estimated repair or replacement costs, and repair or replacement materials (block 1206). The method 1200 may further include the server(s) 114 generating further claim information including a repair reconstruction, a repairs schedule, or a pre-populated insurance claim using the asset or policy data 1204 (block 1208).

The method 1200 may further include starting a virtual meeting, such as the example virtual meeting 902 of FIGS. 9 and 10, between the insured party 102 and the insurance representative 144 (block 1210). One or more aspects of the virtual meeting 902 may be based upon one or more insured party preferences 1212, such as social media account information, metaverse preferences and location information, or avatar preferences or information obtained at block 1202, for example.

As part of the virtual meeting, or separately, the method 1200 may include generating and downloading, for presentation and review, one or more visual depictions 150 of the claim information to an insured party's XR device(s) 126 and/or an insurance representative's XR device(s) 146 (block 1214).

If the claim information is verified or approved (block 1216), they may be placed on, stored on, or streamed to a blockchain (or other distributed ledger) for remote viewing or to facilitate subrogation, claim processing, dispute resolution, etc. (block 1218), the virtual meeting may be ended (block 1220), the claim may be subrogated (block 1222), and control may exit from the method 1200.

Returning to block 1216, if the claim information is not verified or approved (block 1216), the claim information may be updated, changed, or modified based upon insured party or insurance representative feedback (block 1224), and control may return to block 1214 to present one or more visual depictions 150 of the updated claim information.

Exemplary Processing Platform

Figure 13:
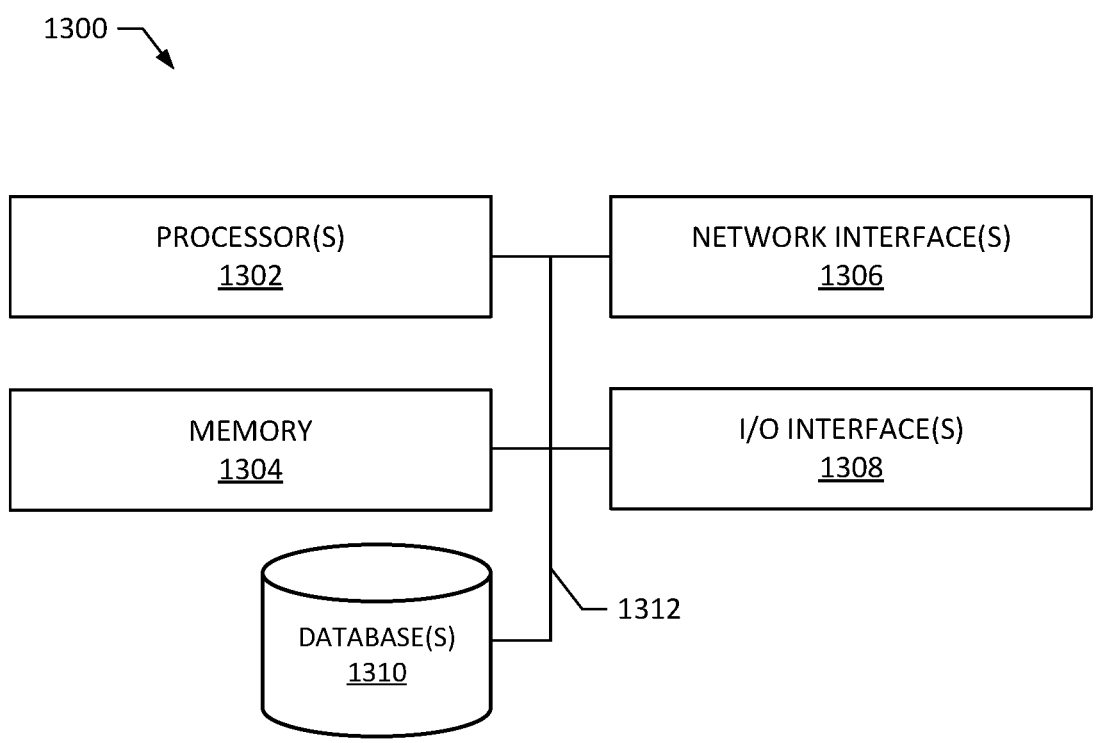
FIG. 13 is a block diagram of an exemplary processing platform for implementing example methods and operations described herein.

FIG. 13 is a block diagram representative of an exemplary processing platform 1300 that may be used to implement, for example, one or more components of the example XR devices 126 and 146, the server(s) 114, or, more generally, the example XR system 100 of FIG. 1. The exemplary processing platform 1300 is capable of executing instructions to, for example, implement operations of the example methods described herein, as may be represented by the flowcharts of the drawings that accompany this description. Other exemplary logic circuits capable of, for example, implementing operations of the example methods described herein include field programmable gate arrays (FPGAs) and application specific integrated circuits (ASICs).

The exemplary processing platform 1300 of FIG. 13 includes a processor 1302 such as, for example, one or more microprocessors, controllers, and/or any suitable type of processor. The example processing platform 1300 of FIG. 13 includes memory (e.g., volatile memory, non-volatile memory) 1304 accessible by the processor 1302 (e.g., via a memory controller). The example processor 1302 interacts with the memory 1304 to obtain, for example, machine-readable instructions stored in the memory 1304 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 1300 to provide access to the machine-readable instructions stored thereon.

The exemplary processing platform 1300 of FIG. 13 includes one or more communication interfaces such as, for example, one or more network interface 1306, and/or one or more input/output (I/O) interfaces 1308. The communication interface(s) enable the processing platform 1300 of FIG. 13 to communicate with, for example, another device or system (e.g., the example XR devices 126 and 146, and the server(s) 114), datastore, database, and/or any other machine.

The exemplary processing platform 1300 of FIG. 13 includes the network interface(s) 1306 to enable communication with other machines (e.g., the example XR devices 126 and 146, the server(s) 114) via, for example, one or more networks, such as the network(s) 116. The exemplary network interface 1306 includes any suitable type of communication interface(s) (e.g., wired and/or wireless interfaces) configured to operate in accordance with any suitable communication protocol(s). Exemplary network interfaces 1306 include a TCP/IP interface, a WiFi™ transceiver (e.g., according to the IEEE 802.11x family of standards), an Ethernet transceiver, a cellular network radio, a satellite network radio, or any other suitable interface based upon any other suitable communication protocols or standards.

The exemplary processing platform 1300 of FIG. 13 may include the input/output (I/O) interface(s) 1308 (e.g., a Bluetooth® interface, an NFC interface, a USB interface, a serial interface, an infrared interface, etc.) to enable receipt of user input (e.g., from input controls of the XR devices 126 and 146, a touch screen, keyboard, mouse, touch pad, joystick, trackball, microphone, button, etc.) and communication of output data (e.g., visual indicators, instructions, data, images, etc.) to the user (e.g., via a display, speaker, printer, etc.).

Exemplary Personalized Virtual User Experiences

The present embodiments may also relate to, inter alia, collecting data, including personal data and virtual user experience preferences, and data related to insurance policies, wills, homes, vehicles, and personal belongings. The data may be collected via several sources, including a virtual headset (e.g., an AR, VR, or XR headset or smart glasses, and/or an associated chat or voice bot), and analyzed by a server or processor to provide practical applications and virtual user experiences to users.

More particularly, the present embodiments disclose systems and methods that may relate to virtual headsets and virtual user experiences. For instance, digitalized data related to (i) insureds and beneficiaries, and their virtual user experience preferences; (ii) life, auto, home, and/or personal articles insurance policies; (iii) wills and trusts; (iv) personal assets, such as homes, autos, financial accounts, or personal articles; and/or (iv) damaged insured assets, such as damaged vehicles, homes, and personal articles damaged as a result of insurance-related events (e.g., vehicle collisions, fire, wind, water, hail, thunderstorms, wildfires, hurricanes, tornadoes, etc.), may be collected and generated, at least in part, via virtual headsets. The data collected may be utilized to create personalized virtual user experiences that are presented or otherwise experienced digitally and/or audibly via virtual headsets.

The personalized virtual user experiences may relate to (i) the disposition of assets via a life insurance policy or will; (ii) generating a homeowners, auto, or personal articles insurance quote; (iii) preparing and/or handling/processing a homeowners, auto, or personal articles insurance claim based upon data collected related to (a) insurance policies, and (b) damaged insured assets; (iv) preparing virtual reconstructions of the insurance-related event for viewing and altering via virtual headsets; (v) preparing virtual representations of home remodeling, home remodeling options, repair or replacement options and materials/cost options for viewing and approving via virtual headsets; (vi) scheduling repair or replacement contractors via virtual headsets; and other applications discussed herein.

Virtual Agent's Office (Metaverse)

Certain embodiments may utilize a virtual headset (such as an AR/VR/XR headset, or smart glasses), chatbot and/or avatar to submit an insurance claim using visuals/icons, such as icons related to selecting damaged insured asset (home, vehicle, personal article), type of damage (collision, fire, water, wildfire, tornado, hail, wind, etc.), location of damage, etc. The customer may use the virtual headset to navigate about the virtual agent's office, such as to prepare a claim or receive a quote.

It should be noted that a life insurance claimant will be the beneficiary, not the insured; as a result, the beneficiary may not have a pre-existing relationship with the insurance provider. So, this immersive experience may be a good way to bridge the "personal touch" and the digital during a difficult time.

The insured may utilize the virtual headset to collect and/or create digitalized life insurance and/or will/trust information of the insured to identify items bequeathed and beneficiaries. A hybrid personalized relationship may be created with beneficiaries by allowing each beneficiary to use a virtual headset and/or chatbot to enter their personal information; preferred financial accounts; preferences for virtual agent or actual agent interaction(s); and/or preferences for metaverse location or virtual area/home interaction. For instance, the beneficiary may, via the virtual headset, select whether they prefer to summon a virtual agent/chat bot, or an actual agent using visual menus/icons or verbally/audible interaction with a chat bot (e.g., if they would like to discuss life insurance policies in general, etc.). Upon the death of the insured, a beneficiary may digitalize a death certificate or other proof of death using a virtual headset.

In some embodiments, the virtual headset, and graphics presented thereon, may walk or guide the beneficiary(s) through the life insurance benefits and/or will or trust using the virtual headset. Additionally, each beneficiary may select one or more their financial account(s) for transferring funds into using the virtual headset for financial bequeaths.

Exemplary Personalized Virtual User Experience

Figure 14:
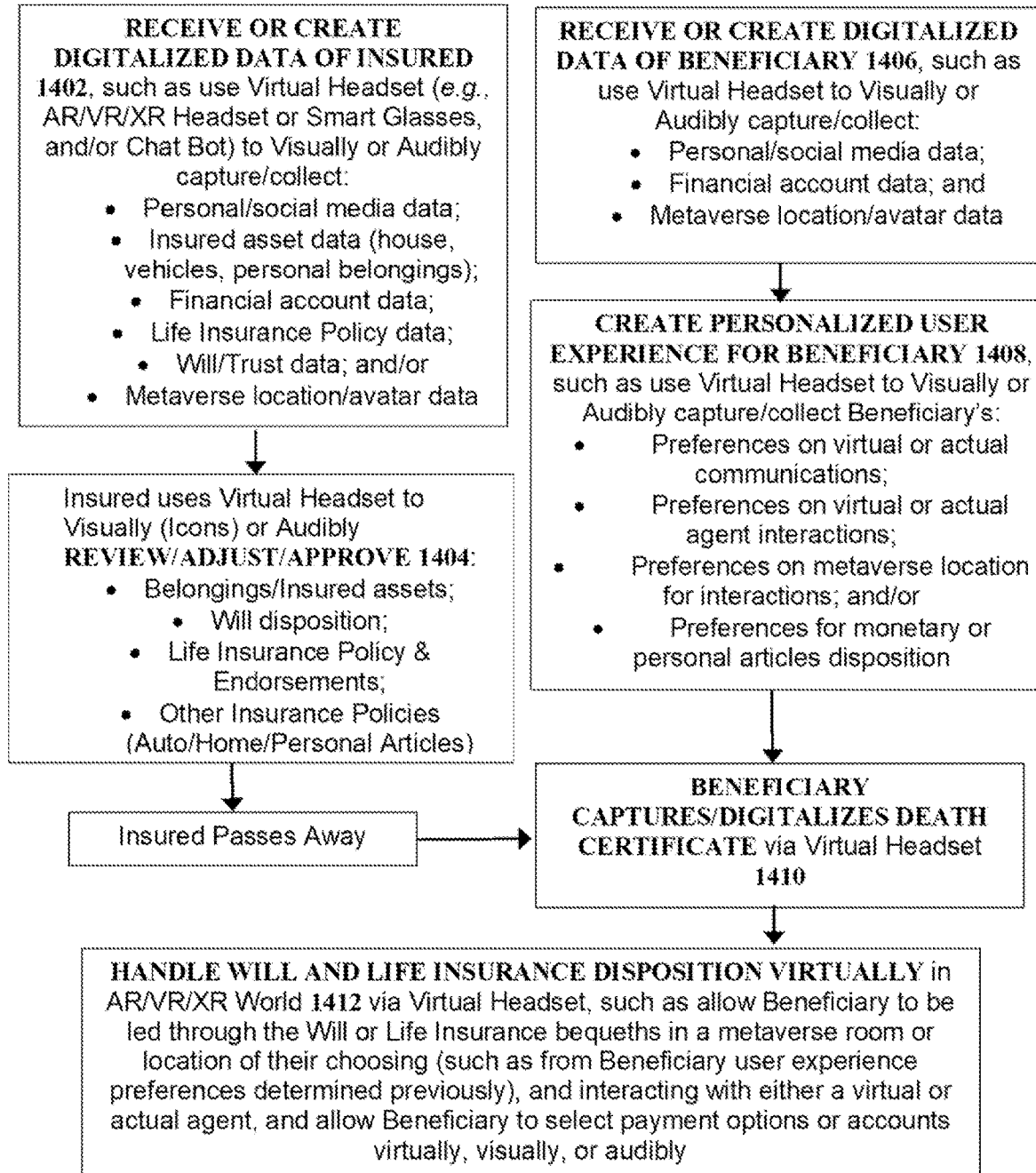
FIG. 14 illustrates an exemplary computer-implemented method utilizing a personalized virtual user experience to dispose of assets identified in a life insurance policy, will, or trust.

FIG. 14 illustrates a computer-implemented method utilizing a personalized virtual user experience to dispose of assets identified in a life insurance policy, will, or trust 1400. The computer-implemented method 1400 may be implemented via one or more local or remote processors, sensors, cameras, transceivers, servers, memory units, chat or voice bots, and/or virtual headsets. The virtual headsets may include AR (Augmented Reality) glasses or headsets, VR (Virtual Reality) glasses or headsets, XR (eXtended Reality) glasses or headsets, or other smart glasses. The headsets or glasses may include audible functionality, such as chat or voice bot functionality, or be configured to work with an associated chat or voice bot, such as a chat or voice bot working with a smart home controller and located within the home.

The computer-implemented method 1400 may include, via one or more local or remote processors, sensors, cameras, transceivers, servers, memory units, chat bots, and/or virtual headsets: (1) receiving or creating digitalized data of an insured 1402, such as via a virtual headset and/or chat bot; (2) allowing the insured to use a virtual headset (and/or chat bot) to visually or audibly review, adjust, and/or approve a listing of assets, and disposition of assets established via a life insurance policy or will 1404; (3) receiving or creating digitalized data of a beneficiary 1406, such as via a virtual headset and/or chat bot; (4) creating a personalized virtual user experience for the beneficiary 1408, such as via a virtual headset and/or chat bot; (5) capturing or receiving a digital death certificate from the beneficiary's virtual headset 1410; and/or (6) handling or processing the disposition of assets identified in a will or life insurance policy in a virtual world via the virtual headset 1412, such as using a virtual headset and/or chat bot. The method may include additional, less, or alternate actions, including those discussed elsewhere herein.

The computer-implemented method 1400 may include, via one or more local or remote processors, sensors, cameras, transceivers, servers, memory units, chat bots, and/or virtual headsets, receiving or creating digitalized data of, or associated with, the insured 1402. For instance, the insured may use a virtual headset (such as smart or virtual glasses or headset; or an AR, VR, or XR headset) and/or chatbot to virtually or audibly capture, collect, and/or digitalize: (i) personal data, including virtual user experience preferences; (ii) social media data; (iii) insured asset data (e.g., house(s), vehicle(s), and personal belonging data); (iv) financial account data; (v) life insurance data; (vi) will and/or trust data; and/or (vii) metaverse location and/or avatar data (such as a virtual location owned or associated with the insured, and a virtual avatar or other virtual character of, or associated with, the insured).

The computer-implemented method 1400 may include, via one or more local or remote processors, sensors, cameras, transceivers, servers, memory units, chat bots, and/or virtual headsets, allowing the insured to review, adjust, modify, and/or approve the digitalized data of the insured 1404. For instance, the insured may use a virtual headset to visually (such as via icons or other graphics) or audibly review, adjust, and/or approve belongings and insured assets (including home features, vehicle features, etc.); will disposition and bequeaths; life insurance policy terms, conditions, and endorsements; and/or other insurance policies and conditions (e.g., home, auto, and personal articles insurance).

The computer-implemented method 1400 may include, via one or more local or remote processors, sensors, cameras, transceivers, servers, memory units, chat bots, and/or virtual headsets, receiving or creating digitalized data of a beneficiary 1406. For instance, a life insurance or will beneficiary identified in the digitalized data of an insured (such as identified within digitalized will or life insurance data) may use a virtual headset to capture or collect (i) personal data and virtual user experience preference data; (ii) social media data; (iii) financial account data; and/or (iv) metaverse location and avatar data (such as a beneficiary's home or other preferred location in the metaverse).

The computer-implemented method 1400 may include, via one or more local or remote processors, sensors, cameras, transceivers, servers, memory units, chat bots, and/or virtual headsets, creating a personalized virtual user experience for the beneficiary 1408. For instance, the beneficiary may use a virtual headset (and/or chat bot) to visually and/or audibly capture, collect, and/or identify the beneficiary's preferences on virtual or actual communications; preferences on virtual or actual agent interactions; preferred metaverse location(s) for virtual interactions; and/or preferences for monetary or personal articles disposition.

In the event that the insured passes away, the computer-implemented method 1400 may include, via one or more local or remote processors, sensors, cameras, transceivers, servers, memory units, chat bots, and/or virtual headsets, the beneficiary capturing and/or digitalizing a death certificate or other proof of the insured passing away 1410. For instance, the beneficiary may capture or otherwise digitalize a death certificate via a virtual headset.

The computer-implemented method 1400 may include, via one or more local or remote processors, sensors, cameras, transceivers, servers, memory units, chat bots, and/or virtual headsets, handling or otherwise processing will and life insurance asset disposition virtually in a virtual world 1412. For instance, the beneficiary may be led through a will or life insurance bequeaths in a metaverse room or location of their choosing (such as from the beneficiary virtual user experience preferences determined previously), interacting with either a preferred virtual or actual agent, and allowing the beneficiary to select payment options or accounts virtually, visually, or audibly.

Exemplary Life Insurance Applications

FIG. 15 illustrates a computer-implemented method utilizing a personalized virtual user experience to dispose of assets identified in a life insurance policy, will, or trust 1500. The computer-implemented method 1500 may be implemented via one or more local or remote processors, sensors, cameras, transceivers, servers, memory units, chat or voice bots, and/or virtual headsets. The virtual headsets may include AR (Augmented Reality) glasses or headsets, VR (Virtual Reality) glasses or headsets, XR (eXtended Reality) glasses or headsets, or other smart glasses. The headsets or glasses may include audible functionality, such as chat or voice bot functionality, or be configured to work with an associated chat or voice bot, such as a chat or voice bot working with a smart home controller and located within the home.

The computer-implemented method 1500 may include, via one or more local or remote processors, sensors, cameras, transceivers, servers, memory units, chat bots, and/or virtual headsets: (1) receiving or creating digitalized data of a life insurance policy (or will) 1502, such as via a virtual headset and/or chat bot; (2) receiving or creating digitalized data of a beneficiary 1504; (3) creating a personalized virtual user experience for the beneficiary 1506; (4) virtually or electronically notifying the beneficiary of the insured passing away 1508; and/or (5) handling or processing the life insurance or will disposition virtually in the virtual world, such as the metaverse 1510. The method may include additional, less, or alternate actions, including those discussed elsewhere herein.

For instance, the computer-implemented method 1500 may include, via one or more local or remote processors, sensors, cameras, transceivers, servers, memory units, chat bots, and/or virtual headsets, receiving or creating digitalized data of, or associated with, the insured 1502. For instance, the insured may use a virtual headset (such as smart or virtual glasses or headset; or an AR, VR, or XR headset) and/or chatbot to virtually or audibly capture, collect, and/or digitalize (i) personal data and virtual user experience preference data; (ii) social media data; (iii) insured asset data (e.g., house(s), vehicle(s), and personal belonging data); (iv) financial account data; (v) life insurance data; (vi) will and/or trust data; and/or (vii) metaverse location and/or avatar data (such as a virtual location owned or associated with the insured, and a virtual avatar or other virtual character of, or associated with the insured). The beneficiary information and name may be extracted from the digitalized data.

The computer-implemented method 1500 may include, via one or more local or remote processors, sensors, cameras, transceivers, servers, memory units, chat bots, and/or virtual headsets, receiving or creating digitalized data of a beneficiary 1504. For instance, a life insurance or will beneficiary identified in the digitalized data of an insured (such as identified within digitalized will or life insurance data) may use a virtual headset and/or chat bot to capture or collect (i) personal data and virtual user experience preference data; (ii) social media data; (iii) financial account data; and/or (iv) metaverse location and avatar data (such as a beneficiary's home or other preferred location in the metaverse).

The computer-implemented method 1500 may include, via one or more local or remote processors, sensors, cameras, transceivers, servers, memory units, chat bots, and/or virtual headsets, receiving or generating a notification of the insured's passing away 1508. Additionally or alternatively, the beneficiary may create a digitalized version of a death certificate, such as by using a virtual headset, or mobile device camera.

The computer-implemented method 1500 may include, via one or more local or remote processors, sensors, cameras, transceivers, servers, memory units, chat bots, and/or virtual headsets, handling or otherwise processing will and life insurance asset disposition virtually in a virtual world 1510. For instance, the beneficiary may be led through a will or life insurance bequeaths in a metaverse room or location of their choosing (such as determined from or identified within the beneficiary virtual user experience preferences determined previously), interacting with either a preferred virtual or actual agent, and allowing the beneficiary to select payment options or accounts virtually, visually, or audibly.

Virtual Crash Reconstruction for Headset Review

With some embodiments, vehicle crash data from vehicle sensors, vehicle telematics data, mobile device data, smart infrastructure data, and/or drones/aerial data associated with a vehicle crash may be collected from one or more data sources and local or remote sensors, transceivers, and processors. The insured or vehicle owner, driver, or passenger may collect additional vehicle crash data using a virtual headset, such as capturing images of each vehicle involved in the crash, the areas of the vehicle collision, and of each vehicle damaged.

The crash data collected may be utilized to generate a model or virtual crash reconstruction. The virtual crash reconstruction may be used to identify which AV (autonomous vehicle) or driver was at fault, or partially at fault, and/or determine other causes/factors (weather, construction, deer, etc.) contributing to the vehicle collision.

The virtual crash reconstruction may be downloaded or streamed to a virtual headset to facilitate and/or allow: (i) the insured and/or agent to review, adjust, and/or approve the accuracy of the virtual crash reconstruction; (ii) the claim handler to review or adjust the virtual crash reconstruction; and/or (iii) the insured and claim handler to view and/or adjust the virtual reconstruction together, and work together to build/confirm the reconstruction. Additionally or alternatively, the insured can utilize the virtual headset to build the reconstruction in real time as he or she describes the accident verbally or using movable icons.

The verified virtual crash reconstruction may be placed on, otherwise stored on, or streamed to, a blockchain for remote viewing to facilitate subrogation, claim processing, dispute resolution, etc. Certain embodiments may also use computer vision and/or connected infrastructure data to resolve disputes associated with insurance-related events.

Home Insurance-Related Events

In some embodiments, for home damage, such as fire or water damage, a budget for repair of the home and/or replacement of fixtures using the virtual headset and/or an associated chat bot. Data may be collected using a virtual headset (and/or home sensors, mobile device sensors, vehicle sensors, etc.). In some embodiments, home telematics or usage data (e.g., water or electricity usage and home occupancy data), and/or vehicle telematics data (acceleration, braking, cornering, location, etc.) may be utilized. Machine learning may be utilized to identify problem(s), i.e., cause of the damage or potential damage, such as leaking pipes, faulty wiring, leaking roof, damaged foundation, etc., and/or to identify materials for repair/replacement. Virtual illustrations or graphical depictions may be created depicting potential problems and/or repair materials for display on the virtual headset.

Home Remodeling

In some embodiments, a virtual headset may be utilized to facilitate home remodeling, such as kitchen or bathroom remodeling. For instance, a customer may utilize a virtual headset to capture images of a house via a home walk-through. From the data collected, sizes and dimensions of rooms may be identified. Audible or visual instructions may be provided to the customer as where to capture more images using the virtual headset. The virtual headset may provide or offer views of several potential remodeled kitchens (or other rooms) with different materials (e.g., different floors, stoves, refrigerators, counter tops, windows, different paint colors, etc.) and display their different costs for each virtual remodel; and once a remodeling option is visually or audibly selected by the customer, the customer may select financing options via the virtual headset and/or associated chat bot.

Homeowners Insurance

As noted elsewhere, in some embodiments, a customer may use a virtual headset to capture images of the interior and exterior of a house via a home walk-through. From machine learning or other processor analysis of the data collected, a homeowners insurance quote, personal articles insurance quote, auto insurance quote, home loan, and/or other quote may be generated. For instance, from analysis of the data, an offer for a home loan may be generated. As an example, for parametric insurance, the capture of the home data via the virtual headset may be used as a trigger to have a home loan offer and/or homeowners insurance quote generated and then presented via the virtual headset.

From machine learning or other processor analysis of the home data collected, areas of risk to the home may be identified to generate risk mitigation recommendations and/or insurance discounts. The data may be analyzed to (1) determine insurance coverage needs/endorsements/riders, etc.; (2) identify gaps in coverage, e.g., identify a boat or a second vehicle stored on the property, or extra structure on the property, that is currently uninsured or underinsured; (3) determine an inventory of items/personal articles about the home (again, such as by using machine learning or other techniques); (4) generate an personal articles insurance quote; and/or (5) for parametric insurance: based on a trigger event, such as a home total loss (wildfire, fire, hurricane, tornado, etc.), (i) generate a list of replacement items for the insured to review, adjust, and/or approve for automatic purchasing of all (or individually selected) items for replacement using the virtual headset and/or chat bot, and/or (ii) generate a potential insurance claim for the cost of the inventory of the items (for payout) for insured's review, modification, and/or approval via the virtual headset and/or chat bot.

Home Risk Mitigation

As noted, with some embodiments, the customer may utilize the virtual headset to capture images of interior and exterior of house via home walk-through. After which, machine learning or other techniques may be utilized to identify sources of water damage and/or other risks, such as hoses or pipes breaking/leaking, water heaters, toilet connections, washing machine hoses, dishwasher hoses, etc. Processor analysis of the data collected may also be utilized to generate recommendations of potential fixes; display or otherwise visually represent fixes and/or repairs on the virtual headset; and generate potential discounts and display insurance savings on the virtual headset. Some embodiments may include partnering with various merchants to identify replacement and/or repair parts and their costs.

Certain embodiments may include utilizing processor analysis of the data collected to identify locations to position, and types of, lights and sensors to improve home security and other functionality.

The virtual headset may display the customer's house and images of risk to the house (such as trees, branches, potential ice, damaged shingles, etc.). Also, types of replacement roofing material may be identified, and an insurance discount may be depicted if the roofing materials are upgraded on the virtual headset.

Auto & Homeowners Insurance Applications

FIG. 16 illustrates a computer-implemented method of auto insurance and homeowners insurance virtual applications 1600. The computer-implemented method 1600 may be implemented via one or more local or remote processors, sensors, cameras, transceivers, servers, memory units, chat or voice bots, and/or virtual headsets. The virtual headsets may include AR (Augmented Reality) glasses or headsets, VR (Virtual Reality) glasses or headsets, XR (eXtended Reality) glasses or headsets, or other smart glasses. The headsets or glasses may include audible functionality, such as chat or voice bot functionality, or be configured to work with an associated chat or voice bot, such as a chat or voice bot working with a smart home controller and located within the home.

The computer-implemented method 1600 may include, via one or more local or remote processors, sensors, cameras, transceivers, servers, memory units, chat bots, and/or virtual headsets: (1) receiving or creating digitalized data of an insured 1602, such as via a virtual headset and/or chat bot; (2) collecting damaged vehicle data or damaged home data via a virtual headset and/or chat bot 1604; (3) collecting vehicle collision data or home event data via other data sources 1606, including vehicle telematics data; (4) creating a virtual reconstruction of the vehicle collision or home event 1608; (5) allowing the insured and/or agent to view the virtual reconstruction via a virtual headset, and modify and/or approve the virtual reconstruction via the virtual headset and/or a chat bot 1610; and/or (6) storing the approved virtual reconstruction on a blockchain for insurance claim handling and/or dispute resolution 1612. Additionally or alternatively, the method 1600 may also include, via one or more local or remote processors, sensors, cameras, transceivers, servers, memory units, chat bots, and/or virtual headsets: (7) analyzing the damaged vehicle data or damaged home data via a machine learning algorithm, model, or program 1614 to (i) estimate repair or replacement costs; (ii) identify repair or replacement materials (and respective suppliers of the materials); (iii) identify qualified and trusted contractors or body shops, and schedule repairs; and/or (iv) prepare an insurance claim for the insured's review, modification, and/or approval; and/or (7) creating a virtual depiction of the repair work and/or predicted final repaired vehicle or home for the insured to review, adjust, and/or approve 1616. The computer-implemented method may include additional, less, or alternate actions, including those discussed elsewhere herein.

The computer-implemented method 1600 may include, via one or more local or remote processors, sensors, cameras, transceivers, servers, memory units, chat bots, and/or virtual headsets, receiving or creating digitalized data of, or associated with, the insured 1602. For instance, the insured may use a virtual headset (such as smart or virtual glasses or headset; or an AR, VR, or XR headset) and/or chatbot to virtually or audibly capture, collect, and/or digitalize (i) personal data and virtual user experience preference data; (ii) social media data; (iii) insured asset data (e.g., house(s), vehicle(s), and personal belonging data); (iv) financial account data; (v) life insurance data, auto insurance data, homeowners insurance data, personal articles insurance data, etc.; (vi) will and/or trust data; and/or (vii) metaverse location and/or avatar data (such as a virtual location owned or associated with the insured, and a virtual avatar or other virtual character of, or associated with the insured).

After an insurance-related event occurs, such as an event that leads to vehicle or home damage, the computer-implemented method 1600 may include, via one or more local or remote processors, sensors, cameras, transceivers, servers, memory units, chat bots, and/or virtual headsets, receiving or creating digitalized data of the vehicle damage or home damage 1604. For instance, an insured may collect data (such as images or audible notes) of, or associated with, a damaged vehicle or damaged home via a virtual headset and/or chat bot.

The computer-implemented method 1600 may include, via one or more local or remote home-mounted sensors, vehicle-mounted sensors, mobile devices, drones, and/or smart infrastructure, collecting or generating data of, or associated with, the damaged vehicle or damaged home, respectively 1606. For instance, vehicle sensors and smart infrastructure data may be associated with, or show, a damaged vehicle or vehicle collision. Smart home sensor, vehicle sensors, or drones may collect data associated with a damaged home. Vehicle telematics data (e.g., acceleration, braking, cornering data) and home telematics data (e.g., electricity usage, water usage, home occupancy data) may also be collected.

The computer-implemented method 1600 may include, via one or more local or remote processors, sensors, cameras, transceivers, servers, memory units, chat bots, and/or virtual headsets, reconstructing the insurance-related event leading to the vehicle or home data using all, or a portion, of the data collected 1608. For instance, a virtual reconstruction of the insurance-related event may be generated or created via one or more processors and servers.

The computer-implemented method 1600 may include (via one or more local or remote processors, sensors, cameras, transceivers, servers, memory units, chat bots, and/or virtual headsets), viewing, altering, and/or approving the virtual reconstruction via a virtual headset 1610. For instance, the insured and/or agent may view the virtual reconstruction, and adjust or alter the virtual reconstruction visually using icons or graphic points, and/or audibly. As an example, the insured may visually move a tree, street light or sign, pedestrians, or vehicles that are represented graphically or by icons, or audibly (via the headset or an associated chat bot), such as by "Move the pine tree three feet to West"; "Add another pedestrian on the East side of the road"; or "Move the black SUV into the passing lane"; or the like.

After the virtual reconstruction is created and/or approved by the insured, the computer-implemented method 1600 may include, via one or more local or remote processors, sensors, cameras, transceivers, servers, memory units, chat bots, and/or virtual headsets, placing or otherwise storing the virtual reconstruction on a blockchain for others to view, and for claim handling and dispute resolution 1612. For instance, the virtual reconstruction may be used for subrogation purposes and/or to determine one or more causes for vehicle damage or home damage, respectively.

The computer-implemented method 1600 may include, via one or more local or remote processors, sensors, cameras, transceivers, servers, memory units, chat bots, and/or virtual headsets, analyzing the damaged vehicle or damaged home data via a machine learning algorithm, model, or program (or using other techniques, such as pattern recognition techniques) 1614 to (i) estimate repair and/or replacement costs; (ii) identify repair and/or replacement materials and suppliers; (iii) schedule repairs with trusted and qualified contractors; and/or (iv) prepare a virtual insurance claim for the insured's review, approval, or modification.

The computer-implemented method 1600 may include, via one or more local or remote processors, sensors, cameras, transceivers, servers, memory units, chat bots, and/or virtual headsets, creating virtual reconstructions or scenarios 1616 depicting or visually displaying, and/or audibly presenting (a) the estimated repair/replacement costs; (b) the repair/replacement materials, suppliers, and/or costs; (c) available contractors, dates for repair work to be performed, contractor rating, and/or virtual calendar of the insured; and/or (d) the virtual insurance claim created. The insured may view, alter, and/or approve the repair materials, replacement materials, contractors, insurance claim, etc. via the visually or audibly using the headset and/or an associated chat bot or chat bot functionality. The virtual reconstructions may be personalized based upon the insured's preferences, such as noted elsewhere herein, to present a personalized virtual user experience to the insured.

Homeowners Insurance Applications

FIG. 17 illustrates a computer-implemented method of auto insurance and homeowners insurance virtual applications 1700. The computer-implemented method 1700 may be implemented via one or more local or remote processors, sensors, cameras, transceivers, servers, memory units, chat or voice bots, and/or virtual headsets. The virtual headsets may include AR (Augmented Reality) glasses or headsets, VR (Virtual Reality) glasses or headsets, XR (eXtended Reality) glasses or headsets, or other smart glasses. The headsets or glasses may include audible functionality, such as chat or voice bot functionality, or be configured to work with an associated chat or voice bot, such as a chat or voice bot working with a smart home controller and located within the home.

The computer-implemented method 1700 may include, via one or more local or remote processors, sensors, cameras, transceivers, servers, memory units, chat bots, and/or virtual headsets: (1) receiving or creating digitalized data of an insured 1702, such as via a virtual headset and/or chat bot; (2) guiding the insured through a walk-through of their house and belongings wearing the virtual headset to capture data, such as images and audible input, associated with, or of, their belongings (e.g., home, home features and characteristics, vehicles, boats, yard, fixtures, etc.) 1704; (3) utilizing machine learning to analyze the data captured and identify areas of risk associated with, or located about, the home and yard 1706; (4) identifying risk or potential damage mitigating or corrective actions, and offering homeowners and other insurance discounts if corrective actions are taken 1708; (5) utilizing machine learning to analyze the data captured and identify areas of interest and items associated with, or located about, the home and yard 1710 (e.g., personal articles, home, home features and characteristics, vehicles, boats, fixtures, etc.); (6) generating a personal articles, homeowners, or auto insurance quote 1712; (7) analyzing the data captured and digitalized data of the insured to identify insurable assets that are uninsured or underinsured (such as insurance for vehicles or boats located on the property, or for structures located on the property, such as a shed or garage), and generating and sending a virtual insurance quote to the insured for viewing on a virtual headset 1714; (8) upon detecting an insurance-related event from analysis of home or other sensor data, generating an insurance claim for the insured related to repair of the home and vehicles, or financial cost or replacement of their personal belongings 1716; (9) creating visual depictions of home remodeling options for viewing on a virtual headset 1718; and/or (10) allowing the insured to view, adjust, or approve one or more of the home remodeling options via the virtual headset and/or chat bot 1720. The computer-implemented method may include additional, less, or alternate actions, including those discussed elsewhere herein.

The computer-implemented method 1700 may include, via one or more local or remote processors, sensors, cameras, transceivers, servers, memory units, chat bots, and/or virtual headsets, receiving or creating digitalized data of, or associated with, the insured 1702. For instance, the insured may use a virtual headset (such as smart or virtual glasses or headset; or an AR, VR, or XR headset) and/or chatbot to virtually or audibly capture, collect, and/or digitalize (i) personal data and virtual user experience preferences; (ii) social media data; (iii) insured asset data (e.g., house(s), vehicle(s), and personal belonging data); (iv) financial account data; (v) life insurance data, auto insurance data, homeowners insurance data, personal articles insurance data, etc.; (vi) will and/or trust data; and/or (vii) metaverse location and/or avatar data (such as a virtual location owned or associated with the insured, and a virtual avatar or other virtual character of, or associated with the insured).

The computer-implemented method 1700 may include, via one or more local or remote processors, sensors, cameras, transceivers, servers, memory units, chat bots, and/or virtual headsets, guiding the insured through a walk-through of their house and belongings wearing the virtual headset to capture data, such as images and audible input, associated with or of their belongings (e.g., home, home features and characteristics, vehicles, boats, yard, fixtures, etc.) 1704. For instance, video or images (and audible notes) collected of the home, yard, and belongings and analyzed to determine whether the items and home features can be identified. If not, visual or audible instructions may be provided via the headset for the user to collect additional video or images of certain items or home areas for further processor analysis.

The computer-implemented method 1700 may include, via one or more local or remote processors, sensors, cameras, transceivers, servers, memory units, chat bots, and/or virtual headsets, utilizing machine learning to analyze the image and/or audio data captured and identify areas of risk associated with, or located about, the home and yard 1706. For instance, after a home walk-through collects data via a headset, the data may be input into a trained machine learning program that is trained to identify risks of home damage, such as (i) leaking faucets, pipes, hoses, dishwasher hoses, washing machine hoses; (ii) damaged or decaying roofing materials or shingles, or siding materials; (iii) over grown trees or shrubbery, such as risk of falling trees, or wildfire hazards too close to a home; etc.

The computer-implemented method 1700 may include, via one or more local or remote processors, sensors, cameras, transceivers, servers, memory units, chat bots, and/or virtual headsets, identifying risk or damage mitigating or corrective actions, and offering homeowners and other insurance discounts if corrective actions are taken 1708. For instance, visual representations of corrective actions may be presented (such as fixing leaking hoses or making other home repairs, trimming tree limbs or shrubbery, repairing damaged roofs, installing home lighting for security, etc.). Repair or replacement parts or materials and suppliers may be identified and depicted visually via the virtual headset or audibly via the chat bot.

The computer-implemented method 1700 may include, via one or more local or remote processors, sensors, cameras, transceivers, servers, memory units, chat bots, and/or virtual headsets, utilizing machine learning to analyze the data captured and identify areas of interest and items associated with, or located about, the home and yard 1710 (e.g., personal articles, home, home features and characteristics, vehicles, boats, fixtures, etc.).

The computer-implemented method 1700 may include, via one or more local or remote processors, sensors, cameras, transceivers, servers, memory units, chat bots, and/or virtual headsets, generating a personal articles, homeowners, or auto insurance quote 1712. The quotes may be based upon home features and characteristics, personal articles, and/or vehicle and vehicle features identified from processor analysis of the data collected via the virtual headset.

The computer-implemented method 1700 may include, via one or more local or remote processors, sensors, cameras, transceivers, servers, memory units, chat bots, and/or virtual headsets, analyzing the data captured and digitalized data of the insured to identify insurable assets that are uninsured or underinsured (such as insurance for vehicles or boats located on the property, or for structures located on the property, such as a shed or garage), and generating and sending a virtual insurance quote to the insured for viewing on a virtual headset 1714. For instance, the virtual headset itself may analyze the items in view in real-time, determine that an item is uninsured (such as a boat parked in the backyard), and generate an insurance quote for review on the visual headset.

The computer-implemented method 1700 may include, via one or more local or remote processors, sensors, cameras, transceivers, servers, memory units, chat bots, and/or virtual headsets, upon detecting an insurance-related event from analysis of home or other sensor data, generating an insurance claim for the insured related to the repair of the home and vehicles, or the financial cost or replacement of their personal belongings 1716. For instance, if there is smoke damage in one or more rooms of the house due to a fire, repair materials and costs may be identified via one or more local or remote processors and then visually and/or audibly presented to the insured via the headset.

The computer-implemented method 1700 may include, via one or more local or remote processors, sensors, cameras, transceivers, servers, memory units, chat bots, and/or virtual headsets, creating visual depictions of home remodeling options for viewing on a virtual headset 1718. For instance, various options for bath or kitchen remodeling may be visually depicted on, and/or audibly presented via, the virtual headset. Different materials and different costs may also be visually displayed or audibly presented to the insured for the review.

The computer-implemented method 1700 may include, via one or more local or remote processors, sensors, cameras, transceivers, servers, memory units, chat bots, and/or virtual headsets, allowing the insured to view, adjust, or approve one or more of the home remodeling options via the virtual headset and/or chat bot 1720. For instance, the insured may alter or adjust the remodeling plans via visual selections (different material selections, different contractor options, different timetable selections for the work being performed) and/or audible interaction(s) with the virtual headset and/or chat bot.

EXEMPLARY EMBODIMENTS

In one aspect, a computer-implemented method of distributing assets in a virtual world via a virtual headset may be provided. The method may include (1) receiving or creating, via an insured virtual headset and/or chat bot associated with an insured, digitalized data of, or associated with, the insured; (2) adjusting and/or approving, via the insured virtual headset and/or chat bot associated with an insured, a listing of assets and a disposition of assets belonging to the insured; (3) receiving or creating, via a beneficiary virtual headset and/or chat bot associated with a beneficiary, digitalized data of, or associated with, the beneficiary; (4) creating, via the beneficiary virtual headset and/or chat bot associated with the beneficiary, a personalized virtual user experience for the beneficiary (that is personalized using one or more visual, graphic, or audible inputs and/or settings selected by beneficiary or predicted for the beneficiary based upon the digitalized data of, or associated with, the beneficiary); (5) capturing or receiving, via the beneficiary virtual headset and/or a chat bot associated with the beneficiary, a digital death certificate of the insured captured by the beneficiary; and/or (6) handling or otherwise processing, via the beneficiary virtual headset and/or a chat bot associated with the beneficiary, the disposition of one or more assets identified in the (i) digital or virtual will, or (ii) digital or virtual life insurance policy in a virtual world via the beneficiary virtual headset and/or chat bot, the virtual world reflecting the personalized virtual user experience for the beneficiary. The method may include additional, less, or alternate actions, including those discussed elsewhere herein.

For instance, creating, via the beneficiary virtual headset and/or chat bot associated with the beneficiary, a personalized virtual user experience for the beneficiary may include (i) determining or receiving preference metaverse location for virtual interactions and experiences of the beneficiary; (ii) receiving one or more visual or audible selections entered by the beneficiary via the virtual headset and/or associated chat bot; and/or (iii) predicting preferred virtual experience settings for the beneficiary based upon the digitalized data of, or associated with, the beneficiary, the digitalized data of the beneficiary including social media posts and the settings including visually or audible settings.

The receiving or creating, via an insured virtual headset and/or chat bot associated with an insured, digitalized data of, or associated with, the insured may include the insured capturing images of an insurance policy or will via the virtual headset to create a digitalized insurance policy or will.

In another aspect, a computer-implemented method of creating a virtual reconstruction of an insurance-related event may be provided. The method may include (1) receiving or creating, via an insured virtual headset and/or chat bot associated with an insured, digitalized data of, or associated with, the insured; (2) receiving or creating, via an insured virtual headset and/or chat bot associated with an insured, digitalized data of, or associated with a damaged vehicle or damaged home; (3) receiving or creating, via one or more additional sources (e.g., vehicle sensors, home sensors, smart infrastructure), digitalized data of, or associated with a damaged vehicle or damaged home; (4) virtually reconstructing, via one or more processors and/or the virtual headset, the insurance-related event that caused the vehicle damage or home damage, respectively; and/or (5) displaying or presenting the virtual reconstruction via the virtual headset to facilitate the insured or agent to view, alter, or approve the virtual reconstruction. The method may include additional, less, or alternate actions, including those discussed elsewhere herein.

For instance, the method may include inputting the damaged vehicle or damage home data into a machine learning program that is trained to (i) estimate repair or replacement costs; (ii) identify repair or replacement materials; (iii) schedule repairs with body shops or home contractors; and/or (iv) prepare a pre-populated virtual insurance claim for the insured's review, modification, or approval. The method may also include (a) using the output of the machine learning program to generate virtual or visual depictions of (i) the estimated repair or replacement costs; (ii) the identified repair or replacement materials; (iii) the scheduled repairs with body shops or home contractors; and/or (iv) the prepare a pre-populated virtual insurance claim for the insured's review, modification, or approval; and/or (b) depict or display the virtual or visual depictions on the virtual headset for the insured's review, modification, or approval.

In another aspect, a computer-implemented method of creating a virtual reconstruction of a home may be provided. The method may include (1) receiving or creating, via an insured virtual headset and/or chat bot associated with an insured, digitalized data of, or associated with, the insured; (2) receiving or creating, via an insured virtual headset and/or chat bot associated with an insured, digitalized data of, or associated with a home, the insured being guided during a home walk-through to capture digitalized home data; (3) receiving or creating, via one or more additional sources (e.g., vehicle sensors, home sensors, smart infrastructure), digitalized data of, or associated with the home; and/or (4) inputting the digitalized home data received or created, via one or more processors, into a trained machine learning program that is trained to identify home features and characteristics, personal belongings, and/or risks of home damage from analysis of the digitalized home data. The method may include additional, less, or alternate actions, including those discussed elsewhere herein.

For instance, the method may include creating, via one or more processors, a virtual reconstruction of a home displaying the risks of home damage identified by the machine learning program; and/or displaying or presenting, via one or more processors and/or the insured virtual headset, the virtual reconstruction including the risks of home damage on the insured virtual headset for the insured to view. The method may also include (i) identifying mitigating or corrective actions, via one or more processors and/or machine learning programs, to reduce the risk of home damage; (ii) creating, via one or more processors and/or the insured virtual headset, a virtual reconstruction of the home displaying the corrective actions; and/or (iii) displaying or presenting, via one or more processors and/or the insured virtual headset, the virtual reconstruction including the corrective actions on the insured virtual headset for the insured to view.

The method may also include (i) creating, via one or more processors and/or the insured virtual headset, one or more home remodeling options based upon the home data collected, the remodeling options including descriptions of materials, costs, suppliers, and/or contractors; and/or (ii) displaying, via one or more processors and/or the insured virtual headset, a virtual depiction of the one or more remodeling options for the insured's review, modification, and/or approval. The method may also include accepting, via one or more processors and/or the insured virtual headset, user selection of (a) materials to be used; (b) contractors to be used, and/or (c) times or days the work is to be performed for the one or more remodeling options.

Exemplary Aspects

The following, non-exclusive list includes various aspects explicitly contemplated by the present disclosure:

Aspect 1. A computer-implemented method of distributing assets in a virtual world via a virtual headset, the method comprising: receiving or creating, via an insured virtual headset and/or chat bot associated with an insured, digitalized data of, or associated with, the insured; adjusting and/or approving, via an insured virtual headset and/or chat bot associated with an insured, a listing of assets and a disposition of assets belonging to the insured; receiving or creating, via a beneficiary virtual headset and/or chat bot associated with a beneficiary, digitalized data of, or associated with, the beneficiary; creating, via the beneficiary virtual headset and/or chat bot associated with the beneficiary, a personalized virtual user experience for the beneficiary (that is personalized using one or more visual, graphic, or audible inputs and/or settings selected by beneficiary or predicted for the beneficiary based upon the digitalized data of, or associated with, the beneficiary); capturing or receiving, via the beneficiary virtual headset and/or a chat bot associated with the beneficiary, a digital death certificate of the insured captured by the beneficiary; and/or handling or otherwise processing, via the beneficiary virtual headset and/or a chat bot associated with the beneficiary, the disposition of one or more assets identified in the (i) digital or virtual will, or (ii) digital or virtual life insurance policy in a virtual world via the beneficiary virtual headset and/or chat bot, the virtual world reflecting the personalized virtual user experience for the beneficiary.

Aspect 2. The computer-implemented method of aspect 1, wherein creating, via the beneficiary virtual headset and/or chat bot associated with the beneficiary, a personalized virtual user experience for the beneficiary includes determining or receiving preference metaverse location for virtual interactions and experiences of the beneficiary.

Aspect 3. The computer-implemented method of aspect 1, wherein creating, via the beneficiary virtual headset and/or chat bot associated with the beneficiary, a personalized virtual user experience for the beneficiary includes receiving one or more visual or audible selections entered by the beneficiary via the virtual headset and/or associated chat bot.

Aspect 4. The computer-implemented method of aspect 1, wherein creating, via the beneficiary virtual headset and/or chat bot associated with the beneficiary, a personalized virtual user experience for the beneficiary includes predicting preferred virtual experience settings for the beneficiary based upon the digitalized data of, or associated with, the beneficiary, the digitalized data of the beneficiary including social media posts and the settings including visually or audible settings.

Aspect 5. The computer-implemented method of aspect 1, wherein receiving or creating, via an insured virtual headset and/or chat bot associated with an insured, digitalized data of, or associated with, the insured includes the insured capturing images of an insurance policy or will via the virtual headset to create a digitalized insurance policy or will.

Aspect 6. A computer-implemented method of creating a virtual reconstruction of an insurance-related event, the method comprising: receiving or creating, via an insured virtual headset and/or chat bot associated with an insured, digitalized data of, or associated with, the insured; receiving or creating, via an insured virtual headset and/or chat bot associated with an insured, digitalized data of, or associated with a damaged vehicle or damaged home; receiving or creating, via one or more additional sources (e.g., vehicle sensors, home sensors, smart infrastructure), digitalized data of, or associated with a damaged vehicle or damaged home; virtually reconstructing, via one or more processors and/or the virtual headset, the insurance-related event that caused the vehicle damage or home damage, respectively; and/or placing or presenting, via the virtual reconstruction via the virtual headset to facilitate the insured or agent to view, alter, or approve the virtual reconstruction.

Aspect 7. The computer-implemented method of aspect 6, the method comprising: inputting the damaged vehicle or damage home data into a machine learning program that is trained to (i) estimate repair or replacement costs; (ii) identify repair or replacement materials; (iii) schedule repairs with body shops or home contractors; and/or (iv) prepare a pre-populated virtual insurance aspect for the insured's review, modification, or approval.

Aspect 8. The computer-implemented method of aspect 7, the method comprising: using the output of the machine learning program to general virtual or visual depictions of (i) the estimated repair or replacement costs; (ii) the identified repair or replacement materials; (iii) the scheduled repairs with body shops or home contractors; and/or (iv) the prepared pre-populated virtual insurance aspect for the insured's review, modification, or approval; and depicting or displaying the virtual or visual depictions on the virtual headset for the insured's review, modification, or approval.

Aspect 9. A computer-implemented method of creating a virtual reconstruction of a home, the method comprising: receiving or creating, via an insured virtual headset and/or chat bot associated with an insured, digitalized data of, or associated with, the insured; receiving or creating, via an insured virtual headset and/or chat bot associated with an insured, digitalized data of, or associated with a home, the insured being guided during a home walk-through to capture digitalized home data; receiving or creating, via one or more additional sources (e.g., vehicle sensors, home sensors, smart infrastructure), digitalized data of, or associated with the home; and/or inputting the digitalized home data received or created, via one or more processors, into a trained machine learning program that is trained to identify home features and characteristics, personal belongings, and/or risks of home damage from analysis of the digitalized home data.

Aspect 10. The computer-implemented method of aspect 9, the method further comprising: creating, via one or more processors, a virtual reconstruction of a home displaying the risks of home damage identified by the machine learning program; and displaying or presenting, via one or more processors and/or the insured virtual headset, the virtual reconstruction including the risks of home damage on the insured virtual headset for the insured to view.

Aspect 11. The computer-implemented method of aspect 10, the method further comprising: identifying mitigating or corrective actions, via one or more processors and/or machine learning programs, to reduce the risk of home damage; creating, via one or more processors and/or the insured virtual headset, a virtual reconstruction of the home displaying the corrective actions; and displaying or presenting, via one or more processors and/or the insured virtual headset, the virtual reconstruction including the corrective actions on the insured virtual headset for the insured to view.

Aspect 12. The computer-implemented method of aspect 9, the method further comprising: creating, via one or more processors and/or the insured virtual headset, one or more home remodeling options based upon the home data collected, the remodeling options including descriptions of materials, costs, suppliers, and/or contractors; and displaying, via one or more processors and/or the insured virtual headset, a virtual depiction of the one or more remodeling options for the insured's review, modification, and/or approval.

Aspect 13. The computer-implemented method of aspect 12, the method further comprising: accepting, via one or more processors and/or the insured virtual headset, user selection of materials to be used, contractors to be used, and times or days the work is to be performed for the one or more remodeling options.

Aspect 14. A computer-implemented method, the method comprising: obtaining, using one or more extended reality (XR) devices, first data representing insured party XR preferences, and second data related to a damage-causing event involving a vehicle; creating, using one or more processors and based upon the second data, a virtual reconstruction of the damage-causing event; and presenting, in a virtualized environment in accordance with the insured party XR preferences via an XR device, the virtual reconstruction such that the insured party or an insurance representative can at least one of view, alter, or approve the virtual reconstruction.

Aspect 15. The computer-implemented method of aspect 14, further comprising: obtaining sensor data related to the damage-causing event, wherein the virtual reconstruction is created based upon the second data and the sensor data.

Aspect 16. The computer-implemented method of aspect 15, further comprising: processing, with one or more trained machine learning models, the second data and the sensor data to determine claim information that includes one or more of (i) estimated repair or replacement costs, (ii) repair or replacement materials, (iii) a repair reconstruction, (iv) a repair schedule repairs, or (v) a pre-populated virtual insurance claim; generating, one or more visual depictions of the claim information; and presenting, in the virtualized environment, the one or more visual depictions for review, modification, or approval of the claim information.

Aspect 17. The computer-implemented method of aspect 15, wherein the one or more sensors are associated with one or more of the vehicle, a mobile device associated with a person within the vehicle, other vehicles, a smart-device infrastructure, or an Internet-of-things infrastructure.

Aspect 18. The computer-implemented method of aspect 17, wherein the sensor data represents one or more of telematics data, driving behavior data, or environmental conditions.

Aspect 19. The computer-implemented method of aspect 14, further comprising: causing the virtual reconstruction to be stored on a distributed ledger.

Aspect 20. The computer-implemented method of aspect 14, wherein presenting the virtual reconstruction in the virtualized environment includes providing a virtual meeting of avatars of the insured party and the insurance representative via respective XR devices.

Aspect 21. The computer-implemented method of aspect 14, wherein the XR preferences represent one or more of profile data for the insured party, virtual interaction preferences, metaverse preferences, or avatar preferences.

Aspect 22. The computer-implemented method of aspect 14, wherein the second data represents a damage scene, the damage-causing event, damage to a vehicle, damage to objects, injuries to persons, events or circumstances surrounding the damage-causing event, or conditions at the time of the damage-causing event.

Aspect 23. The computer-implemented method of aspect 14, wherein the XR device includes at least one of (i) an augmented reality (AR), mixed reality (MR), or virtual reality (VR) headset, (ii) AR, MR, or VR smart glasses.

Aspect 24. The computer-implemented method of aspect 14, wherein the one or more XR devices include the XR device.

Aspect 25. A system, comprising: a communication interface configured to receive, using one or more extended reality (XR) devices first data associated with insured party XR preferences, and second data related to a damage-causing event involving a vehicle; and one or more processors configured to: create, based upon the second data, a virtual reconstruction of the damage-causing event, and present, in a virtualized environment in accordance with the insured party XR preferences via an XR device, the virtual reconstruction such that the insured party or an insurance representative can at least one of view, alter, or approve the virtual reconstruction.

Aspect 26. The system of aspect 25, wherein the communication interface is configured to obtain, from one or more sensors, sensor data related to the damage-causing event, and wherein the one or more processors are configured to create the virtual reconstruction based upon the second data and the sensor data.

Aspect 27. The system of aspect 26, wherein the one or more processors are configured to: process, with one or more trained machine learning models, the second data and the sensor data to determine claim information that includes one or more of (i) estimated repair or replacement costs, (ii) repair or replacement materials, (iii) a repair reconstruction, (iv) a repair schedule repairs, or (v) a pre-populated virtual insurance claim; generate one or more visual depictions of the claim information; and present, in the virtualized environment, the one or more visual depictions for review, modification, or approval of the claim information.

Aspect 28. The system of aspect 26, wherein the one or more sensors are associated with one or more of the vehicle, a mobile device associated with a person within the vehicle, other vehicles, a smart-device infrastructure, or an Internet-of-things infrastructure, and wherein the sensor data represents one or more of telematics data, driving behavior data.

Aspect 29. The system of aspect 25, wherein the one or more processors are configured to cause the virtual reconstruction to be stored on a distributed ledger.

Aspect 30. The system of aspect 25, wherein presenting the virtual reconstruction includes providing a virtual meeting of avatars of the insured party and the insurance representative via respective XR devices.

Aspect 31. The system of aspect 25, wherein the insured party XR preferences represent one or more of profile data for the insured party, virtual interaction preferences, metaverse preferences, or avatar preferences.

Aspect 32. The system of aspect 25, wherein the second data comprises data representing, or associated with, a damage scene, the damage-causing event, damage to a vehicle, damage to objects, injuries to persons, events or circumstances surrounding the damage-causing event, and conditions at the time of the damage-causing event.

Aspect 33. A non-transitory computer-readable storage medium storing instructions that, when executed by one or more processors, cause a system to: obtain, using one or more extended reality (XR) devices, first data representing insured party XR preferences, and second data related to a damage-causing event involving a vehicle; create, using one or more processors and based upon the second data, a virtual reconstruction of the damage-causing event; and present, in a virtualized environment in accordance with the insured party XR preferences via an XR device, the virtual reconstruction such that the insured party or an insurance representative can at least one of view, alter, or approve the virtual reconstruction.

Aspect 34. The storage medium of aspect 33, wherein the instructions, when executed by one or more processors, cause the system to: obtain sensor data related to the damage-causing event; and create the virtual reconstruction based upon the second data and the sensor data.

Aspect 35. The storage medium of aspect 34, wherein the instructions, when executed by one or more processors, cause the system to: process, with one or more trained machine learning models, the second data and the sensor data to determine claim information that includes one or more of (i) estimated repair or replacement costs, (ii) repair or replacement materials, (iii) a repair reconstruction, (iv) a repair schedule repairs, or (v) a pre-populated virtual insurance claim; generate, one or more visual depictions of the claim information; and present, in the virtualized environment, the one or more visual depictions for review, modification, or approval of the claim information.

Aspect 36. The storage medium of aspect 33, wherein the instructions, when executed by one or more processors, cause the system to: cause the virtual reconstruction to be stored on a distributed ledger.

ADDITIONAL CONSIDERATIONS

The above description refers to block diagrams of the accompanying drawings. Alternative implementations of the examples represented by the block diagrams include one or more additional or alternative elements, processes, and/or devices. Additionally or alternatively, one or more of the example blocks of the diagrams may be combined, divided, re-arranged, or omitted. Components represented by the blocks of the diagrams may be implemented by hardware, software, firmware, and/or any combination of hardware, software, and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines.

Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present).

Some exemplary logic circuits are hardware that executes machine-readable instructions to perform operations (e.g., one or more of the operations described herein and represented by the flowcharts of this disclosure, if such are present). Some exemplary logic circuits include a combination of specifically configured hardware and hardware that executes machine-readable instructions.

The above description refers to various operations described herein and flowcharts that may be appended hereto to illustrate the flow of those operations. Any such flowcharts are representative of example methods disclosed herein. In some examples, the methods represented by the flowcharts implement the apparatuses represented by the block diagrams. Alternative implementations of example methods disclosed herein may include additional or alternative operations.

Further, operations of alternative implementations of the methods disclosed herein may combined, divided, re-arranged, or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

Unless expressly stated to the contrary, "or" refers to an inclusive or and not to an exclusive or. For example, "A, B, or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media and/or virtual headsets, thereby making a computer program product, i.e., an article of manufacture, according to the discussed embodiments of the disclosure. The computer-readable media may be, for example, but is not limited to, a virtual headset or portion thereof, fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor or virtual headset, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to store and provide machine instructions and/or data to a programmable processor, including a machine-readable medium that receives machine instructions as a machine-readable signal. The "machine-readable medium" and "computer-readable medium," however, do not include transitory or propagating signals. The term "machine-readable signal" refers to any signal used to provide machine instructions and/or data to a programmable processor.

As used herein, a processor may include any programmable system including systems using virtual headsets and/or micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory for any suitable duration of time (e.g., permanently, for an extended period of time (e.g., while a program associated with the machine-readable instructions is executing), and/or a short period of time (e.g., while the machine-readable instructions are cached and/or during a buffering process)). The above memory types are examples only, and are thus not limiting as to the types of memory usable for storage of a computer program.

In one embodiment, a computer program is provided, and the program is embodied on a computer readable medium and/or virtual headset. In some embodiments, the system is executed on a single computer system or virtual headset, without requiring a connection to a server computer. In a further embodiment, the system is being run at least in part in a Windows® environment (Windows is a registered trademark of Microsoft Corporation, Redmond, Washington). In yet another embodiment, the system is run at least in part on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices, such as virtual headsets in wireless communication with one or more local or more processors or servers over one or more radio frequency links. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "exemplary embodiment," "one embodiment," or "some embodiments" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

While the preferred embodiments have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for generating an extended reality (XR) environment for review and analysis of vehicle damage, comprising:

obtaining, by one or more processors of a server from one or more XR devices including an XR device associated with an insured party, first data representing insured party XR preferences of the insured party and second data comprising one or more images related to a damage-causing event involving a vehicle and captured concurrently with the damage-causing event;

creating, by the one or more processors of the server and based upon the second data, a virtual reconstruction of the damage-causing event by processing the one or more images to (i) generate a virtual representation of an environment of the damage-causing event, (ii) generate a virtual representation of the vehicle within the environment, and (iii) move the virtual representation of the vehicle through the virtual representation of the environment to simulate the damage-causing event;

transmitting, from the one or more processors of the server to the XR device associated with the insured party, virtual environment data representing aspects of a virtualized environment in accordance with the insured party XR preferences;

presenting, by the XR device associated with the insured party, the virtual reconstruction based upon the virtual environment data, together with one or more controls to view, alter, or approve the virtual reconstruction;

receiving, by the one or more processors of the server, an indication of approval of the virtual reconstruction from the XR device associated with the insured party;

in response to receiving the indication of approval, processing, by the one or more processors of the server with one or more trained machine learning models, the second data to determine the vehicle damage to one or more components of the vehicle that were damaged during the damage-causing event;

generating, by the one or more processors of the server, one or more visual depictions of the vehicle damage to the one or more components of the vehicle to be overlaid on a representation of the vehicle in the virtualized environment;

transmitting, from the one or more processors of the server to the XR device associated with the insured party, the one or more visual depictions of the vehicle damage; and presenting, by the XR device associated with the insured party in the virtualized environment, the one or more visual depictions of the vehicle damage by overlaying the one or more visual depictions over the representation of the vehicle for review, modification, or approval.

2. The computer-implemented method of claim 1, further comprising:

obtaining, by the one or more processors of the server from one or more sensors, sensor data related to the damage-causing event, wherein the virtual reconstruction is created based upon the second data and the sensor data.

3. The computer-implemented method of claim 2, further comprising:

processing, by the one or more processors of the server with the one or more trained machine learning models, the second data and the sensor data to determine claim information that includes one or more of (i) estimated repair or replacement costs, (ii) repair or replacement materials, (iii) a repair reconstruction, (iv) a repair schedule repairs, or (v) a pre-populated virtual insurance claim;

generating, by the one or more processors of the server, one or more additional visual depictions of the claim information;

transmitting, from the one or more processors of the server to the XR device associated with the insured party, the one or more visual depictions; and presenting, by the XR device associated with the insured party in the virtualized environment, the one or more additional visual depictions for review, modification, or approval of the claim information.

4. The computer-implemented method of claim 2, wherein the one or more sensors are associated with one or more of the vehicle, a mobile device associated with a person within the vehicle, other vehicles, a smart-device infrastructure, or an Internet-of-things infrastructure.

5. The computer-implemented method of claim 4, wherein the sensor data represents one or more of telematics data, driving behavior data, or environmental conditions.

6. The computer-implemented method of claim 1, further comprising:

causing, by the one or more processors of the server, the virtual reconstruction to be stored on a distributed ledger.

7. The computer-implemented method of claim 1, wherein presenting the virtual reconstruction in the virtualized environment includes providing a virtual meeting of avatars of the insured party and an insurance representative using the XR device associated with the insured party and an additional XR device associated with the insurance representative.

8. The computer-implemented method of claim 1, wherein the XR preferences represent one or more of profile data for the insured party, virtual interaction preferences, metaverse preferences, or avatar preferences.

9. The computer-implemented method of claim 1, wherein the second data represents damage to an additional vehicle, damage to objects, injuries to persons, events or circumstances surrounding the damage-causing event, or conditions at a time of the damage-causing event.

10. The computer-implemented method of claim 1, wherein the XR device associated with the insured party includes at least one of (i) an augmented reality (AR), mixed reality (MR), or virtual reality (VR) headset, or (ii) AR, MR, or VR smart glasses.

11. A system for generating an extended reality (XR) environment for review and analysis of vehicle damage, comprising:

a communication interface configured to receive, from one or more XR devices including an XR device associated with an insured party, first data associated with insured party XR preferences of the insured party and second data comprising one or more images related to a damage-causing event involving a vehicle and captured concurrently with the damage-causing event; and one or more processors configured to:

create, based upon the second data, a virtual reconstruction of the damage-causing event by processing the one or more images to (i) generate a virtual representation of an environment of the damage-causing event, (ii) generate a virtual representation of the vehicle within the environment, and (iii) move the virtual representation of the vehicle through the virtual representation of the environment to simulate the damage-causing event;

transmit, via the communication interface to the XR device associated with the insured party, virtual environment data representing aspects of a virtualized environment in accordance with the insured party XR preferences to cause the XR device associated with the insured party to present, in the virtualized environment based upon the virtual environment data, the virtual reconstruction, together with one or more controls to view, alter, or approve the virtual reconstruction;

receive, via the communication interface, an indication of approval of the virtual reconstruction from the XR device associated with the insured party;

in response to receiving the indication of approval, process, with one or more trained machine learning models, the second data to determine the vehicle damage to one or more components of the vehicle that were damaged during the damage-causing event;

generate one or more visual depictions of the vehicle damage to the one or more components of the vehicle to be overlaid on a representation of the vehicle in the virtualized environment; and transmit, via the communication interface to the XR device associated with the insured party, the one or more visual depictions to cause the XR device associated with the insured party to present, in the virtualized environment, the one or more visual depictions of the vehicle damage by overlaying the one or more visual depictions over the representation of the vehicle for review, modification, or approval.

12. The system of claim 11,
wherein the communication interface is configured to obtain, from one or more sensors, sensor data related to the damage-causing event, and
wherein the one or more processors are configured to create the virtual reconstruction based upon the second data and the sensor data.

13. The system of claim 12, wherein the one or more processors are configured to:
process, with one or more trained machine learning models, the second data and the sensor data to determine claim information that includes one or more of (i) estimated repair or replacement costs, (ii) repair or replacement materials, (iii) a repair reconstruction, (iv) a repair schedule repairs, or (v) a pre-populated virtual insurance claim;
generate one or more additional visual depictions of the claim information; and
transmit, via the communication interface to the XR device, the one or more additional visual depictions to cause the XR device to present, in the virtualized environment, the one or more additional visual depictions for review, modification, or approval of the claim information.

14. The system of claim 12,
wherein the one or more sensors are associated with one or more of the vehicle, a mobile device associated with a person within the vehicle, other vehicles, a smart-device infrastructure, or an Internet-of-things infrastructure, and
wherein the sensor data represents one or more of telematics data, driving behavior data, or environmental conditions.

15. The system of claim 11, wherein the one or more processors are configured to cause the virtual reconstruction to be stored on a distributed ledger.

16. The system of claim 11, wherein presenting the virtual reconstruction includes providing a virtual meeting of avatars of the insured party and an insurance representative using the XR device associated with the insured party and an additional XR device associated with the insurance representative.

17. The system of claim 11, wherein the second data comprises data representing, or associated with, a damage scene, the damage-causing event, damage to an additional vehicle, damage to objects, injuries to persons, events or circumstances surrounding the damage-causing event, and conditions at a time of the damage-causing event.

18. A non-transitory computer-readable storage medium storing instructions for generating an extended reality (XR) environment for review and analysis of vehicle damage that, when executed by one or more processors, cause a system to:
obtain, from one or more XR devices including an XR device associated with an insured party, first data representing insured party XR preferences of the insured party and second data comprising one or more images related to a damage-causing event involving a vehicle and captured concurrently with the damage-causing event;
create, based upon the second data, a virtual reconstruction of the damage-causing event by processing the one or more images to (i) generate a virtual representation of an environment of the damage-causing event, (ii) generate a virtual representation of the vehicle within the environment, and (iii) move the virtual representation of the vehicle through the virtual representation of the environment to simulate the damage-causing event;
transmit, to the XR device associated with the insured party, virtual environment data representing aspects of a virtualized environment in accordance with the insured party XR preferences to cause the XR device associated with the insured party to present, in the virtualized environment based upon the virtual environment data, the virtual reconstruction, together with one or more controls to view, alter, or approve the virtual reconstruction;
receive an indication of approval of the virtual reconstruction from the XR device associated with the insured party;
in response to receiving the indication of approval, process, with one or more trained machine learning models, the second data to determine the vehicle damage to one or more components of the vehicle that were damaged during the damage-causing event;
generate one or more visual depictions of the vehicle damage to the one or more components of the vehicle to be overlaid on a representation of the vehicle in the virtualized environment; and
transmit, to the XR device associated with the insured party, the one or more visual depictions to cause the XR device associated with the insured party to present, in the virtualized environment, the one or more visual depictions of the vehicle damage by overlaying the one or more visual depictions over the representation of the vehicle for review, modification, or approval.

19. The non-transitory computer-readable storage medium of claim 18, wherein the instructions, when executed by the one or more processors, cause the system to:
obtain sensor data related to the damage-causing event; and
create the virtual reconstruction based upon the second data and the sensor data.

20. The non-transitory computer-readable storage medium of claim 19, wherein the instructions, when executed by the one or more processors, cause the system to:
process, with one or more trained machine learning models, the second data and the sensor data to determine claim information that includes one or more of (i) estimated repair or replacement costs, (ii) repair or replacement materials, (iii) a repair reconstruction, (iv) a repair schedule repairs, or (v) a pre-populated virtual insurance claim;
generate one or more additional visual depictions of the claim information; and
transmit, to the XR device associated with the insured party, the one or more additional visual depictions to cause the XR device associated with the insured party to present, in the virtualized environment, the one or more additional visual depictions for review, modification, or approval of the claim information.

* * * * *